US008833070B2

(12) United States Patent
Wilson et al.

(10) Patent No.: US 8,833,070 B2
(45) Date of Patent: Sep. 16, 2014

(54) LOW-DRAG HYDRO-PNEUMATIC POWER CYLINDER AND SYSTEM

(75) Inventors: Gavin P. Wilson, Beavercreek, OH (US); Michael J. Wilson, Bowdon, GA (US); Conner C. Wilson, Beavercreek, OH (US)

(73) Assignee: Gravitair Rights, Inc., Sparks, NV (US)

( * ) Notice: Subject to any disclaimer, the term of this patent is extended or adjusted under 35 U.S.C. 154(b) by 168 days.

(21) Appl. No.: 13/338,843

(22) Filed: Dec. 28, 2011

(65) Prior Publication Data

US 2012/0090312 A1    Apr. 19, 2012

Related U.S. Application Data

(63) Continuation of application No. PCT/US2010/041030, filed on Jun. 28, 2010.

(60) Provisional application No. 61/269,803, filed on Jun. 29, 2009.

(51) Int. Cl.
*F03B 17/02* (2006.01)
*F03B 17/04* (2006.01)

(52) U.S. Cl.
CPC .......... *F03B 17/02* (2013.01); *Y02E 60/17* (2013.01); *Y02E 10/20* (2013.01); *Y02E 10/28* (2013.01)
USPC ........... 60/496; 415/5; 415/7; 415/92; 60/495

(58) Field of Classification Search
CPC ................................. F03B 17/02; F03B 17/04
USPC .......... 60/495–507, 649, 398; 290/42, 43, 44, 290/52, 53, 54, 1 R; 415/7, 92, 52.1, 58.2, 5
See application file for complete search history.

(56) References Cited

U.S. PATENT DOCUMENTS

| 211,143 | A | * | 1/1879 | Fogarty | 60/496 |
| 271,040 | A | * | 1/1883 | Cook | 60/496 |

(Continued)

FOREIGN PATENT DOCUMENTS

| JP | 11-343957 A | 12/1999 |
| JP | 2003-155971 A | 5/2003 |
| WO | 2006-108901 A1 | 10/2006 |

OTHER PUBLICATIONS

International Search Report and Written Opinion, Jan. 12, 2012, Korean Intellectual Property Office.

*Primary Examiner* — Thomas Denion
*Assistant Examiner* — Laert Dounis
(74) *Attorney, Agent, or Firm* — Taft Stettinius & Hollister, LLP; Stephen F. Rost

(57) ABSTRACT

A hydro-pneumatic cylinder for converting buoyancy energy of compressed gas into mechanical energy. The cylinder can include a pair of end plates disposed at opposite ends of the cylinder and a drive axle extending longitudinally through the cylinder and passing through the center of each end plate. The cylinder can also include a core support coupled to each end plate and centrally disposed in the cylinder and a plurality of vanes for promoting a low-drag flow. Each of the plurality of vanes is coupled to the core support and the pair of end plates. A bucket is defined by the core support, two of the plurality of vanes, and the pair of end plates. The cylinder further includes a vane support coupled to the plurality of vanes and the core support. The vane support defines a plurality of openings formed therein through which a gas can pass for equalizing pressure in the bucket.

13 Claims, 25 Drawing Sheets

(56) References Cited

U.S. PATENT DOCUMENTS

| | | | | |
|---|---|---|---|---|
| 650,063 A | * | 5/1900 | Kersten et al. | 60/496 |
| 3,715,885 A | * | 2/1973 | Schur | 60/496 |
| 3,860,355 A | * | 1/1975 | Dell | 415/7 |
| 4,170,114 A | * | 10/1979 | Pruett | 60/496 |
| 4,196,590 A | * | 4/1980 | Fries | 60/496 |
| 4,245,473 A | * | 1/1981 | Sandoval | 60/496 |
| 4,363,212 A | * | 12/1982 | Everett | 60/496 |
| 4,703,621 A | * | 11/1987 | Barrett | 60/496 |
| 5,735,665 A | * | 4/1998 | Kang | 415/3.1 |
| 6,447,243 B1 | * | 9/2002 | Kittle | 415/92 |
| 7,628,528 B2 | * | 12/2009 | Zeikus | 366/102 |
| 2005/0252206 A1 | * | 11/2005 | Holmevik et al. | 60/495 |
| 2010/0095666 A1 | * | 4/2010 | Brumfield | 60/495 |

* cited by examiner

LOW-DRAG HYDRO-PNEUMATIC POWER CYLINDER AND SYSTEM

CROSS-REFERENCE TO RELATED APPLICATIONS

This application is a continuation of International Application Serial No. PCT/US2010/040130, filed on Jun. 28, 2010, which claims the benefit of U.S. Provisional Patent Application Ser. No. 61/269,803, filed Jun. 29, 2009, which are hereby incorporated by reference in their entirety.

FIELD OF DISCLOSURE

This disclosure relates to a mechanical power device, and in particular, to a buoyancy-based mechanical power device.

BACKGROUND

While mankind has found methods of harnessing several forces of nature, notably absent has been a successful method of harnessing the force of gravity in a buoyant environment. Previous attempts to manipulate objects in the buoyant area have consistently fallen short. These designs have physical design shortfalls that significantly reduce their ability to capture most of the potential buoyancy-based effects available to them. Additionally, previous designs have failed to capture the available potential and kinetic energy created by physical exchanges of gases and liquids, induced liquid-to-liquid motion, liquid-on-liquid friction, etc.

Hydro-dynamic drag based on physical design is a major energy reducer to any buoyancy-based device. Failure to design and fabricate buoyant machines with the most hydrodynamic (lowest drag coefficient) shapes, causes great amounts of energy to be drained off and lost to liquid friction and needless movement by the high drag inherent in mechanical motion working inside liquid environments. Conventional designs have restrictive physical design aspects with high-drag components/designs that seriously impede each device's ability to create mechanical energy.

In other efforts, considerable energy is lost by failure to attempt to collect the energy during either liquid to gas displacements or gas to liquid displacements. When something materially changes inside a buoyancy power conversion device during the buoyancy-to-mechanical energy conversion process, regardless of the design, there has been an inability to capture the energy inherent in these energy transitions and material movements.

Other conventional designs have limited the conversion of buoyant energy to rotational power. These designs restrict the balancing of the buoyant forces by limiting transfer of drive gases amongst their buckets thereby allowing overfilling of some buckets and under-filling of others on the same horizontal plane.

Another significant design concern is the use of less than optimally proportioned bucket volumes relative to the overall device size. Some designs have overly large bucket depths that place buoyant gases too close to the device core, where more energy is used to create gas charges than is recouped during the buoyant operations. Other designs incorporate smaller than optimum bucket volumes relative to the overall device and/or reduced bucket numbers. The deficiencies of both designs significantly reduce the ability to conduct buoyant work.

Conventional designs also do not reduce frictional hydrodynamic drag through the use of active hydro-dynamic drag reduction means such as micro-bubble injection, polymer injection, etc. Further, these conventional designs fail to manage expanding gas heat depletion of the working/drive liquids caused by expanding gases having much lower relative retained heat energy than they had in their compressed state. With the exception of a high-temperature or steam gas operation where the working/drive liquid is kept at a higher temperature, continuous operations of any non-thermal gas-driven buoyancy motor's expanding gases can quickly reduce each device's working/drive liquid temperature to a level below their freezing points.

Therefore, a need exists for a mechanical device that can reduce frictional hydro-dynamic drag, balance buoyant forces along their vanes, and capture the kinetic energy available during gas-to-liquid and liquid-to-gas transfers.

SUMMARY

In an exemplary embodiment of the present invention, a mechanical power device is able to reduce frictional hydrodynamic drag through the use of an active hydro-dynamic drag reduction means such as micro-bubble injection, polymer injection, etc.

In one exemplary embodiment, a hydro-pneumatic cylinder includes a first end plate and a second end plate oppositely disposed from one another in the cylinder. The first and second end plates are substantially planar and parallel to one another. The cylinder also includes a drive axle extending longitudinally through the cylinder and passing through the first and second end plates. A core support is coupled to each end plate and centrally disposed in the cylinder and a plurality of vanes is provided for promoting a low-drag flow. Each of the plurality of vanes is coupled to the core support and the first and second end plates. The cylinder further includes a bucket defined by the core support, two of the plurality of vanes, and the first and second end plates. The cylinder also includes a vane support coupled to the plurality of vanes. The vane support is substantially parallel to the first and second end plates such that the vane support defines a plurality of openings formed therein through which a fluid can pass for equalizing pressure in the bucket.

In one form of this embodiment, the cylinder can include a microbubbler coupled to at least one of the first and second end plates. The microbubbler is configured to reduce dynamic drag and can be substantially parallel to the end plate to which it is coupled. In another form thereof, the bucket comprises a plurality of buckets. For example, in this embodiment, the number of buckets can be approximately the same as the number of vanes. In addition, the drive axle can include a passageway defined therethrough. In another arrangement, the vane support divides the bucket into a first portion and a second portion such that the first portion is fluidly coupled to the second portion by the plurality of openings defined in the vane support.

In another embodiment, a system is provided for converting buoyancy energy of a compressed fluid into mechanical energy. The system includes a fluid-tight tank containing a liquid. The tank has a cover disposed at a top end and a fluid charging device is coupled to a bottom end of the tank. The system also includes a thermal management system for maintaining the temperature of the liquid and a hydro-pneumatic cylinder disposed in the tank. The cylinder is submerged in the liquid. In addition, the cylinder includes a drive axle extending longitudinally along an axis and a plurality of buckets defined therein. At least one of the plurality of buckets receives compressed fluid from the fluid charging device such that the compressed fluid buoyantly imparts rotational motion of the cylinder about the axis.

In a similar embodiment, the cylinder can include a first end plate and a second end plate oppositely disposed from one another in the cylinder. The first and second end plates are substantially planar and parallel to one another. A core support is coupled to each end plate and disposed in the cylinder. The cylinder can include a plurality of vanes for promoting a low-drag flow such that each of the plurality of vanes is coupled to the core support and the first and second end plates. The cylinder also includes a vane support coupled to the plurality of vanes. The vane support is substantially parallel to the first and second end plates such that the vane support defines a plurality of openings formed therein through which a fluid can pass for equalizing pressure in the bucket. In addition, the cylinder includes a dynamic drag reduction apparatus coupled to one of the first and second end plates. The dynamic drag reduction apparatus is substantially parallel to the first and second end plates.

In another form of this embodiment, the vane support divides each of the plurality of buckets into a first portion and a second portion such that the first portion is fluidly coupled to the second portion by the plurality of openings defined in the vane support. The system can further include a low-friction bearing disposed on each side of the cylinder. The supply line is thermally insulated for maintaining the temperature of the fluid entering the fluid charging device.

In a different form of this embodiment, the fluid charging device comprises a plenum housing or rotary valve. The fluid charging device can include a cutout portion fluidly coupled to at least one of the plurality of buckets. In the embodiment of a rotary valve, the rotary valve defines a passageway and emission orifice. The passageway fluidly couples the supply line to the emission orifice for directing compressed fluid to the cylinder. The system can also include a fluid distribution equalizer chamber for expanding the fluid and maintaining equilibrium of pressures in the fluid charging device.

In a different embodiment, a hydro-pneumatic cylinder is provided for converting buoyancy energy into kinetic energy. The cylinder includes a first end plate and a second end plate oppositely disposed from one another in the cylinder. The first and second end plates are substantially planar and parallel to one another. A drive axle extends longitudinally through the cylinder and passes through the first and second end plates. The cylinder also includes a core support coupled to each end plate and disposed in the cylinder. A plurality of vanes is provided for promoting a low-drag flow. Each of the plurality of vanes is coupled to the core support and the first and second end plates. The cylinder further includes a bucket defined by the core support, two of the plurality of vanes, and the first and second end plates. In addition, a dynamic drag reduction apparatus is coupled to one of the end plates and is substantially parallel to the pair of end plates.

In this embodiment, the cylinder can include a vane support coupled to the plurality of vanes. The vane support is substantially parallel to the first and second end plates. Also, the vane support defines a plurality of openings formed therein through which a fluid can pass for equalizing pressure in the bucket. The vane support further divides each of the plurality of buckets into a first portion and a second portion such that the first portion is fluidly coupled to the second portion by the plurality of openings defined in the vane support.

In accordance with one embodiment, a Hydro-Pneumatic Power Cylinder (HPC) includes a submerged axle-mounted cylindrically-shaped body having an end-cap disc coupled to each distal end of the center cylinder with multiple vanes axially coupled to the center cylinder face and inside surfaces of the end-cap disc. Spaces are defined by the surfaces of each adjacent vane, the exposed center cylinder face, and the exposed inner surfaces of the end-cap discs. The apparatus is gas-charged by a plenum that regulates the working liquid/working gas transfers or charged through a set of rotary gas injection valves, one valve embedded to each cylinder end. Drag-reducing micro-bubble gas emitters are coupled to high hydro-dynamic drag features and or statically placed strategically near the cylinder. The HPC is able to capture and fully utilize gravity's buoyancy-based effect.

The HPC can introduce any light-weight gas under pressure, either compressed or thermally expanded, into a vastly heavier liquid. It is also able to utilize the principle of moment-arm leverage by moving the gas-filled working buoyant buckets further away from the central point/axle to increase the effective power output of the Power Cylinder. This allows use of application-based engineered 'wet-area' buckets/spaces to reduce the drive gas requirements for specific HPC power outputs. As such, the size of the HPC can be matched to the application's power input needs. To ease HPC production efforts, classes of production standard-sized HPCs can be specifically designed and built with bucket depths/widths matched to the specific end-item's application needs. A standard-sized HPC having a set diameter can be lengthened to increase the power output to match a specific user's power input requirements.

The HPC can recycle and reuse the drive gases from purposely compressed sources to ensure a continuously available supply of clean drive gases, thereby eliminating the need for foreign-contaminant gas filtering efforts or machinery/devices. The HPC is also capable of managing the effects of heat transfer processes concomitant to the drive gases' compression, transmission, and release/expansion. As such, the HPC can maintain the drive liquid at a temperature which maximizes drive liquid density and yet prevents freezing of the drive liquids by rapidly expanding drive gases.

The HPC can advantageously be located in any environment so long as appreciable gravity is available. This can include non-terrestrial environments. The HPC can be built in various sizes to meet specified net power production needs ranging from one horsepower (one Kilowatt) to millions of horsepower (hundreds of Megawatts). Likewise, the HPC can be used as a rotational power source/prime mover for driving industrial processes or prime electrical power generation.

Also, the HPC can be combined either serially or in parallel with similar power producing units to increase the power output available. A power plant with rows of multiple buoyancy capture machines is capable of providing Giga-watts of electrical energy.

In at least one embodiment of the HPC, a powerful gas-injection function that increases overall power output is achieved by injecting drive gases into the base of the buckets, thereby forcing the liquid from the buckets. The introduction of the drive gases into the buckets represents a dynamic change of state for each bucket at each gas-filling occurrence. By filling the buckets from the inside out creates significant back-pressure inside the bucket and converts this powerful bucket-filling activity into a basic hydraulic pump jet, thereby allowing this energetic gas-transfer to be rotationally captured in the axle.

The HPC also includes static baffles outside thereof that can retard liquid movement close to the lower buckets that are actively filled with gas and ejecting liquids. Such baffles provide a stagnant liquid resistance to the liquids ejecting from the buckets thereby increasing the overall system power by increasing back pressure to the ejecting liquids. The HPC design can include intra-bucket passages along the length of each bucket allowing for maximum transfer of the drive gas to fill each bucket linearly and equally, thereby maximizing, equalizing, and balancing the buoyant power of each bucket.

The HPC can further use gas-filled buckets which are substantially filled for the maximum duration possible. Since most of the HPCs power is derived from buoyancy, the more liquid-displacing gas by volume inside each rising bucket increases that specific bucket's buoyancy-based lift, thereby increasing use of the gas-filled bucket's contribution to total power of the device. This design of the bucket in both shape, bucket-vane length, and intra-bucket transfer passages maximizes the percentage of the bucket retaining gas for the maximum time duration possible, thereby capturing the maximum buoyant force available along the HPC's rotational 'timing' allowing for the greatest effect.

The HPC can have a low-drag physical design such that each vane follows the previous one. This feature can greatly reduce energy-draining parasitic, hydro-dynamic surface friction and design drag. The HPC can also include an active gas-entrapped boundary control layer (BCL), hydro-dynamic drag-reduction technique that injects micro-bubbles into the liquid space between the static liquid surrounding the HPC and the dynamic liquid moving with and in contact with the HPC. Continuous injection of the micro-bubbles present in the BCL and adjacent interfaces allow multiple hydro-dynamic forces to compress and expand the gases in the micro-bubbles which greatly reduces energy-draining parasitic drag created in and between the BCL interfaces.

In addition, the HPC can include either ultra-low-friction magnetic bearings or ultra-low-friction air bearings to support a drive axle and reduce friction-based energy losses (bearing choice dependent on application and device size). The HPC can also include an operationally and neutrally buoyant design that reduces the relative weight of HPC. This can reduce gravitationally-based frictional pressures on the HPC's support bearings and reduce the effect of weight on the bearing support structures. The HPC can have an operationally reliable design with systemic redundancy designed throughout the system by use of an ultra-low maintenance HPC design, options for multiple gas compression sources, and up to two drive shaft connections, one per side of the device, available for use to power industrial processes or prime power electrical production devices.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
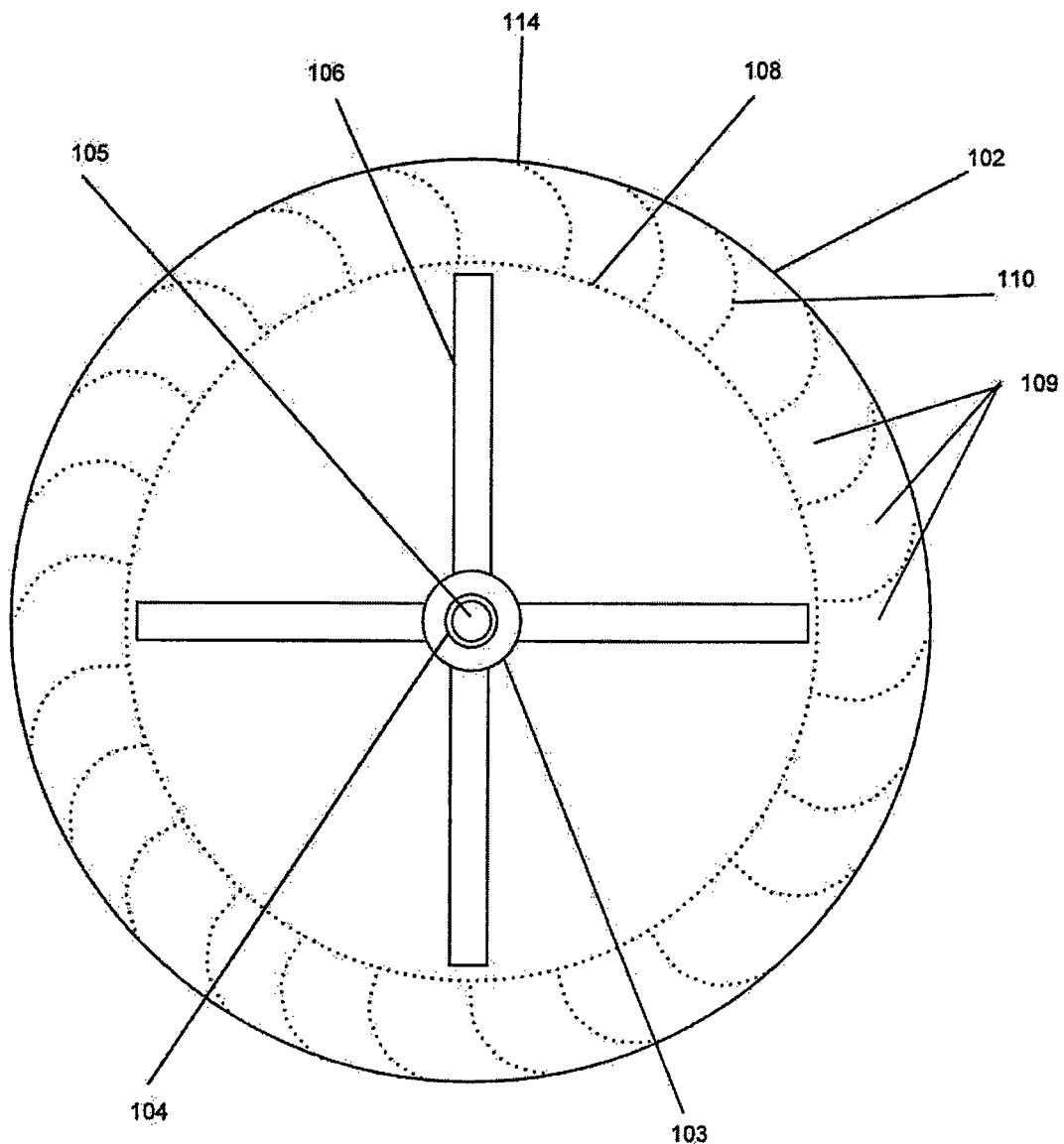
FIG. 1 is an end view of a Hydro-Pneumatic Cylinder (HPC)

In FIG. 1, an exemplary embodiment of a Hydro-Pneumatic Power Cylinder (HPC) 102 is provided for translating gravitationally-based buoyant forces to rotational force. The HPC 102 is comprised of a drive axle 104 which is inserted centrally through a set of two separate perpendicular circular-shaped HPC end-plates 114, each of which defines the opposite ends of the HPC 102. The drive axle 104 has a central gas passageway 105 going end-to-end throughout its center and has a drive axle flange 103 coupled to each end. The two end-plates 114 are separated by a rigid hollow centrally located cylindrically-shaped HPC core support 108 which is coupled to the HPC end-plates 114. The core support 108 can have additional internal structure (not shown) coupling the core support 108 to the drive axle 104 to assist in transferring operational loads to the central axle.

Coupled in a leak-proof manner to the outer face of the HPC core support 108 and the exposed inner-facing surfaces of the HPC-end plates 114 are a multitude of curvilinear HPC vanes 110 coupled equidistantly around the circumference of the HPC core support 108—the exact number of vanes and specific vane depth is dependent on the size, stated efficiency and desired operational HPC power output requirements. The HPC vanes 110 curve from their longitudinal inner-base attachment to the HPC core support 108 toward the vane's outer edge which terminate in a low-drag, flowing manner. The vane's curved edges are coupled to the inner faces of the HPC end plates 114. The adjacent surfaces of the HPC vanes 110, the HPC core support 108, and interior exposed surfaces of the HPC end plates 114 define a single HPC bucket area 109. Each HPC design has a specified multitude of vanes and therefore an equal number of buckets 109 as vanes 110.

Coupled in a flush-mounting, low hydro-dynamic drag manner into a set of micro-bubbler radial cutout slots 115 (FIG. 13), cut in a radial manner into the HPC end-plates 114, is a set of end-plate micro-bubblers 106. The number and position of the end-plate micro-bubblers 106 can be matched to the specific HPC application design and can be dependent on the specified drag reduction needs of that particular HPC's operational needs. In this embodiment, four end-plate micro-bubblers 106 per each end of HPC 102 are shown, however, in other embodiments there can be other micro-bubbler designs and layouts.

Figure 2:
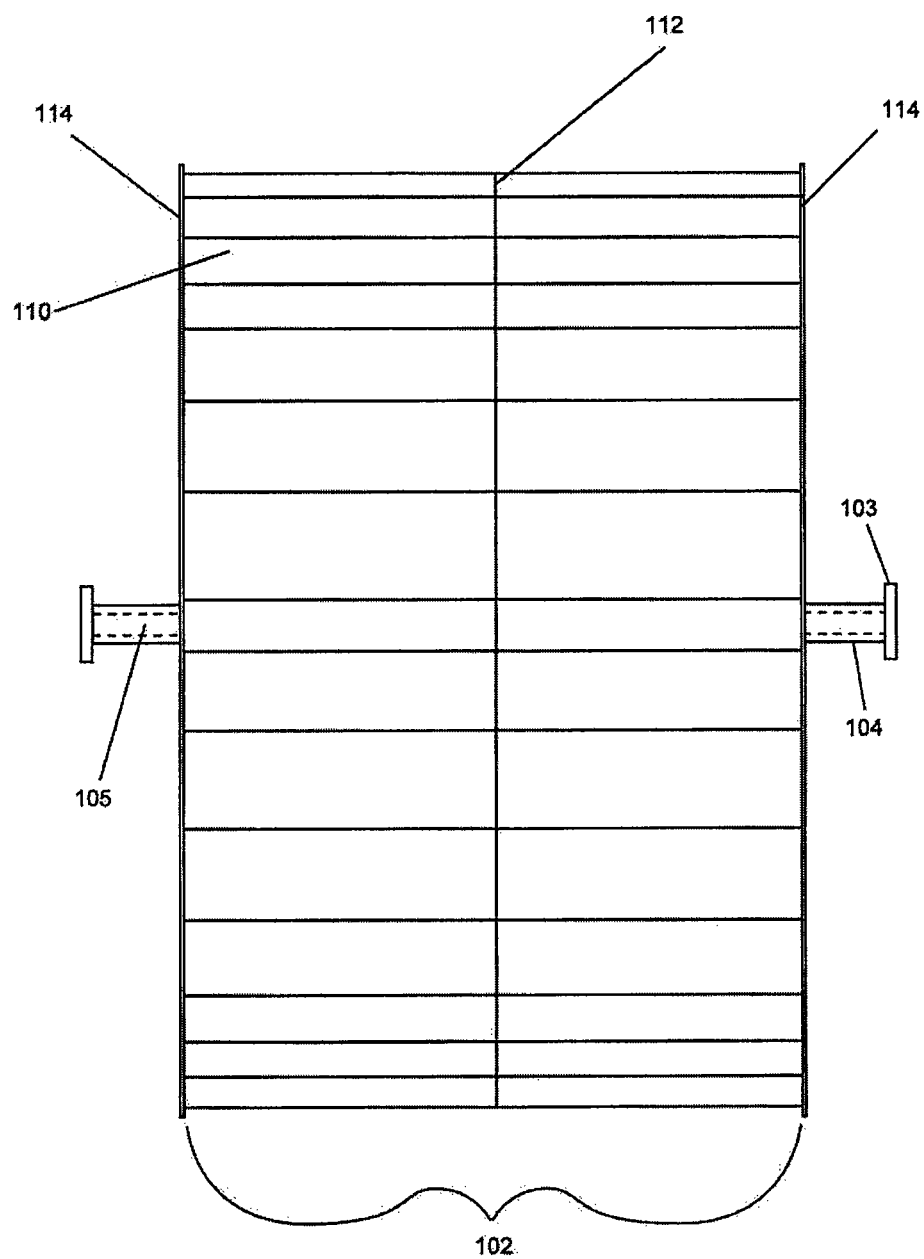
FIG. 2 is a face-side view of the HPC of FIG. 1.

In FIG. 2, the vane's 110 outer faces, drive axle 104, drive axle central gas passageway 105, drive axle flanges 103, HPC end-plates 114, viewed on edge, and a vane intermediate support 112 that is perpendicular to and solidly coupled to both the inner surface of the HPC vanes 110 and the HPC core support 108 (not separately depicted in this drawing) are shown. As shown, the HPC end plates 114 extend past the outer edges of the HPC vanes 110 to provide a gas leakage seal to a drive gas plenum 124 (shown in FIG. 4).

Figure 3:
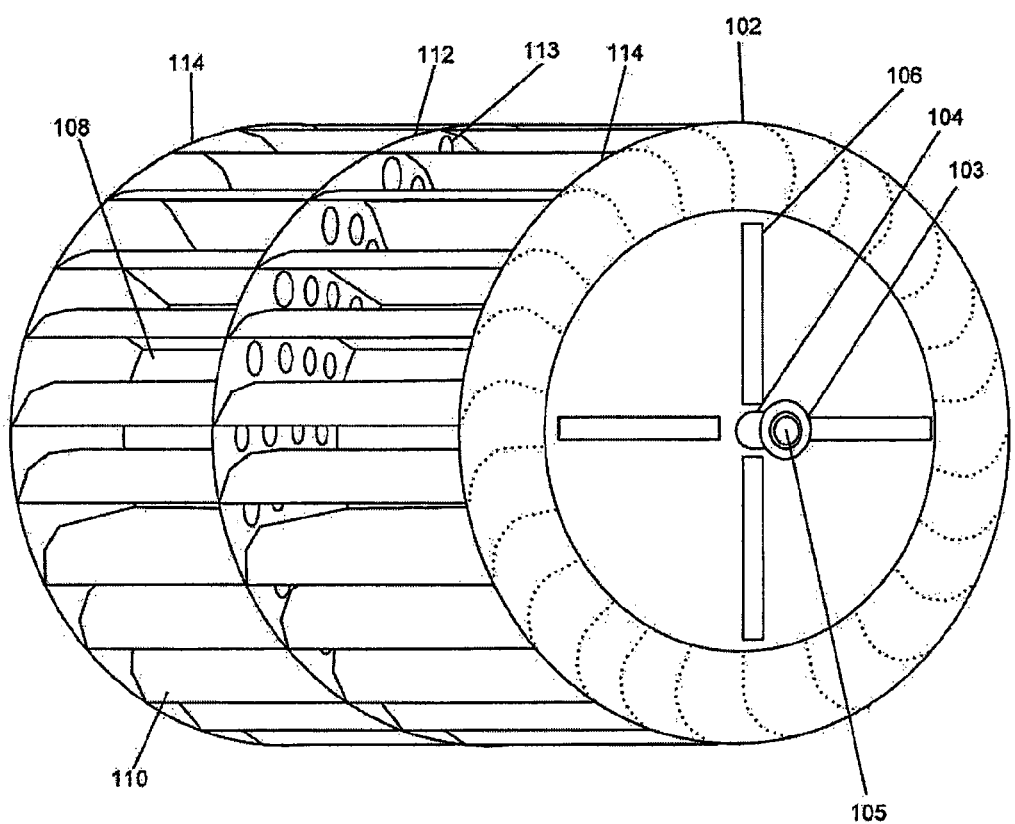
FIG. 3 is a drive side orthogonal view of the HPC.

Referring to FIG. 3, the HPC 102 vanes 110 can attach to the face of the HPC core support 108 as supported by a vane intermediate support 112. While the embodiment in FIG. 3 includes a singular intermediate vane support 108, larger HPC developments may use multiple vane supports along their HPC face in their design and operations. Such vane supports are required to assist the vanes 110 in controlling the energy creating buoyant forces during HPC operations and assisting the vanes in containing the multi-path load forces encountered during the highly energetic and dynamic liquid draining and gas charging actions during HPC operations. Additionally, the vane supports 112 assist the vanes 110 in maintaining their low-drag hydro-dynamic profile while the vanes carry the operational loads caused by the buoyant forces.

Figure 25:
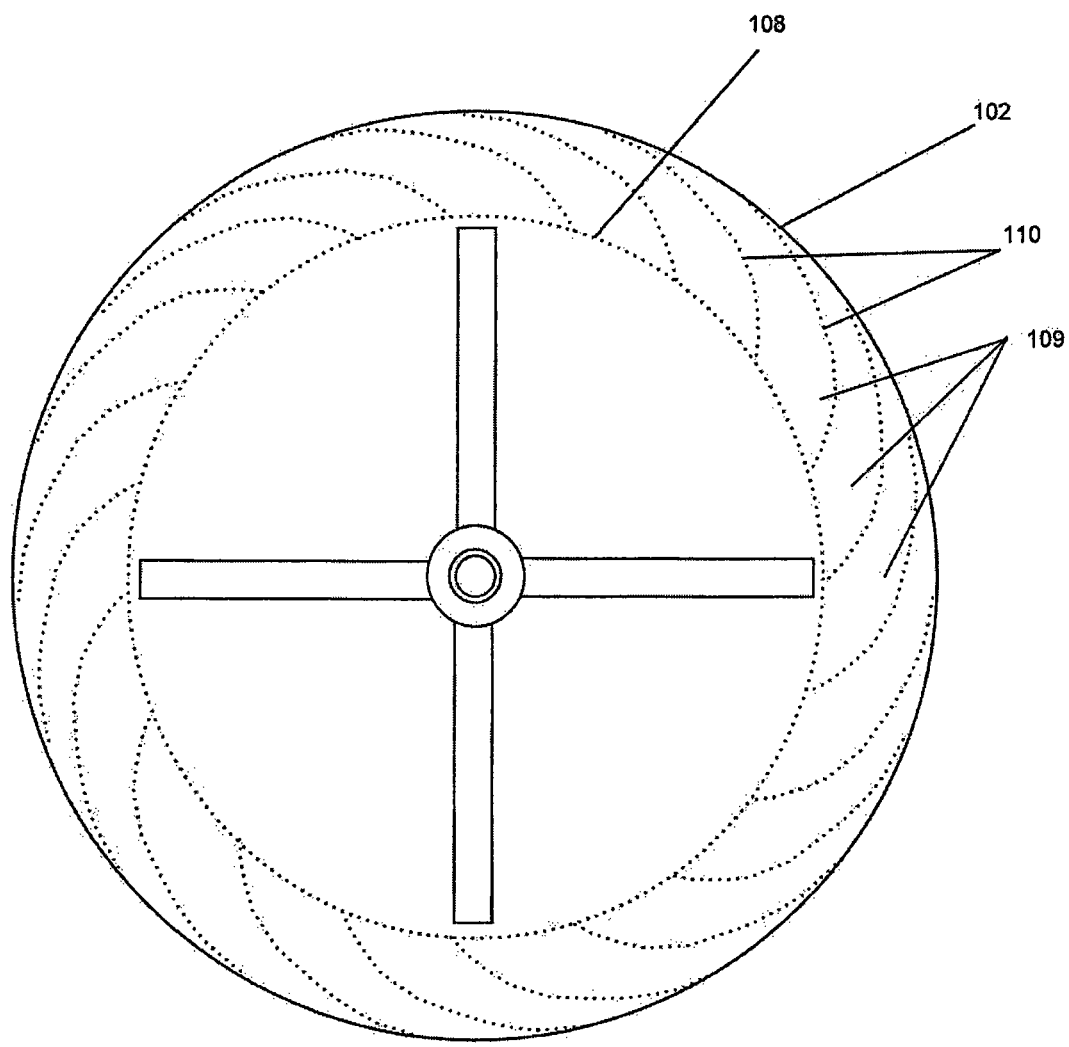
FIG. 25 is an end view of a HPC with Deep Vanes and Buckets.

Multiple vane intermediate support gas pass-through openings or holes 113 are defined in the vane intermediate support 112. These holes 113 are located inside each bucket area 109 of the HPC 102 (as depicted in FIGS. 1 and 25) which allow bucket pressure equalization, and reduce the overall HPC 102 weight. The drive axle 104 with drive axle central gas passageway 105 and the drive axle flanges 103 is also shown. The entire structure is solidly and immovably attached together to form the HPC 102. The flush-mounted end-plate micro-bubblers 106 can be coupled to the HPC end plates 114.

Figure 4:
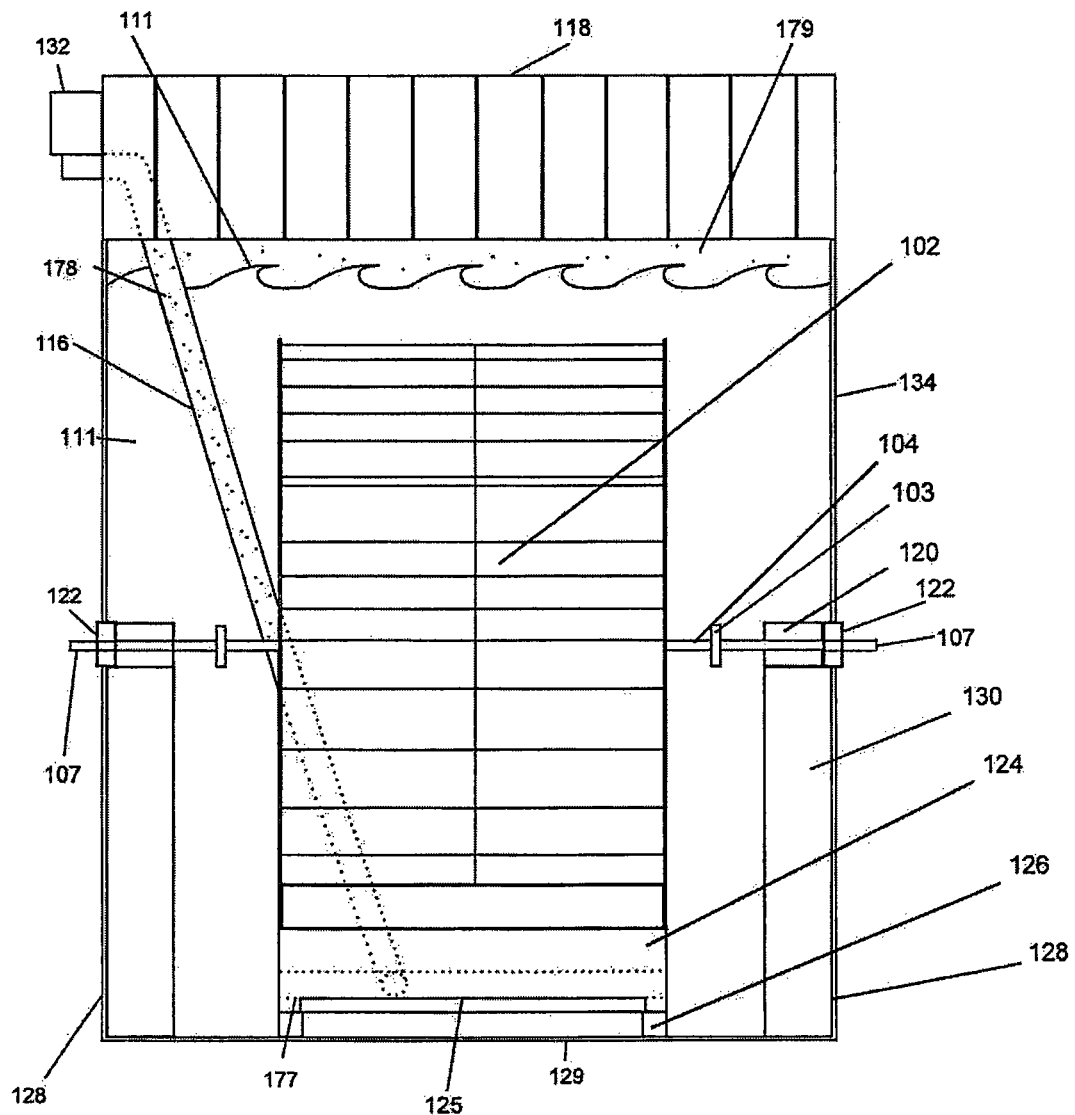
FIG. 4 is a face side cut-away view of the HPC Tank and its internal parts as seen with the side of the Tank removed for illustrative purposes.

Turning to FIG. 4, the HPC 102 is disposed inside a large liquid-tight tank 134 (note that the side of the tank 134 has been removed for illustrative purposes only). A set of outer drive axles 107 couple to the drive axle flanges 103 that are coupled to the drive axle 104. A laterally-rounded stressed-skin membrane type HPC tank cover 118 is coupled to the top of the tank 134 in a gas tight leak-proof manner to capture all expended drive gases 179. A conventional stressed-skin membrane tank cover 118 is often used in industrial buildings, airport hangars, etc. The HPC 102 is surrounded by a drive liquid 111 in the tank 134, supported on its outer drive axle 107 by a sturdy axle-enclosing HPC axle bearing 120 on each side of the HPC 102. The HPC axle bearing 120 is a low-friction bearing and is supported by a HPC bearing support 130 which is coupled to the left and right tank walls 128. The HPC 102 is supported similarly on both sides. The outer drive axle 107 extends through the distal side of the HPC axle bearing 120 and extends through a liquid-tight tank wall seal 122 mounted into the left and right sides of the tank walls 128, and extends through matching holes defined in the left and right tank walls (note that the defined holes are not separately depicted from the left and right tank wall seals 122).

A drive gas plenum 124 is coupled to the tank bottom 129 by a series of plenum support footers 126. The drive gas plenum 124 is fed a drive gas 178 through a thermally insulated drive gas supply line 116 which enters from the back side of a HPC tank cover 118, with the thermally insulated drive gas supply line 116 firmly attached along its length to the right-side tank wall 128. This drive gas 178 exits the line 116 into a drive gas supply control valve 176 (not separately depicted in this drawing) which controls the release of the gas 178 into a drive gas distribution equalizer chamber 177 which couples to a drive gas plenum 124. Coupled in the center of the back side of the tank cover 118 is a drive gas return line 132 which collects all expended drive gas 179 that buoyantly rises above the drive liquid 111. Also shown on the front bottom edge of the drive gas plenum 124 is a plenum drive gas overflow cutout 125 which is used to assist initial HPC rotational operations by directing plenum overflow gas (not separately shown) to the drive side of the HPC 102.

Figure 5:
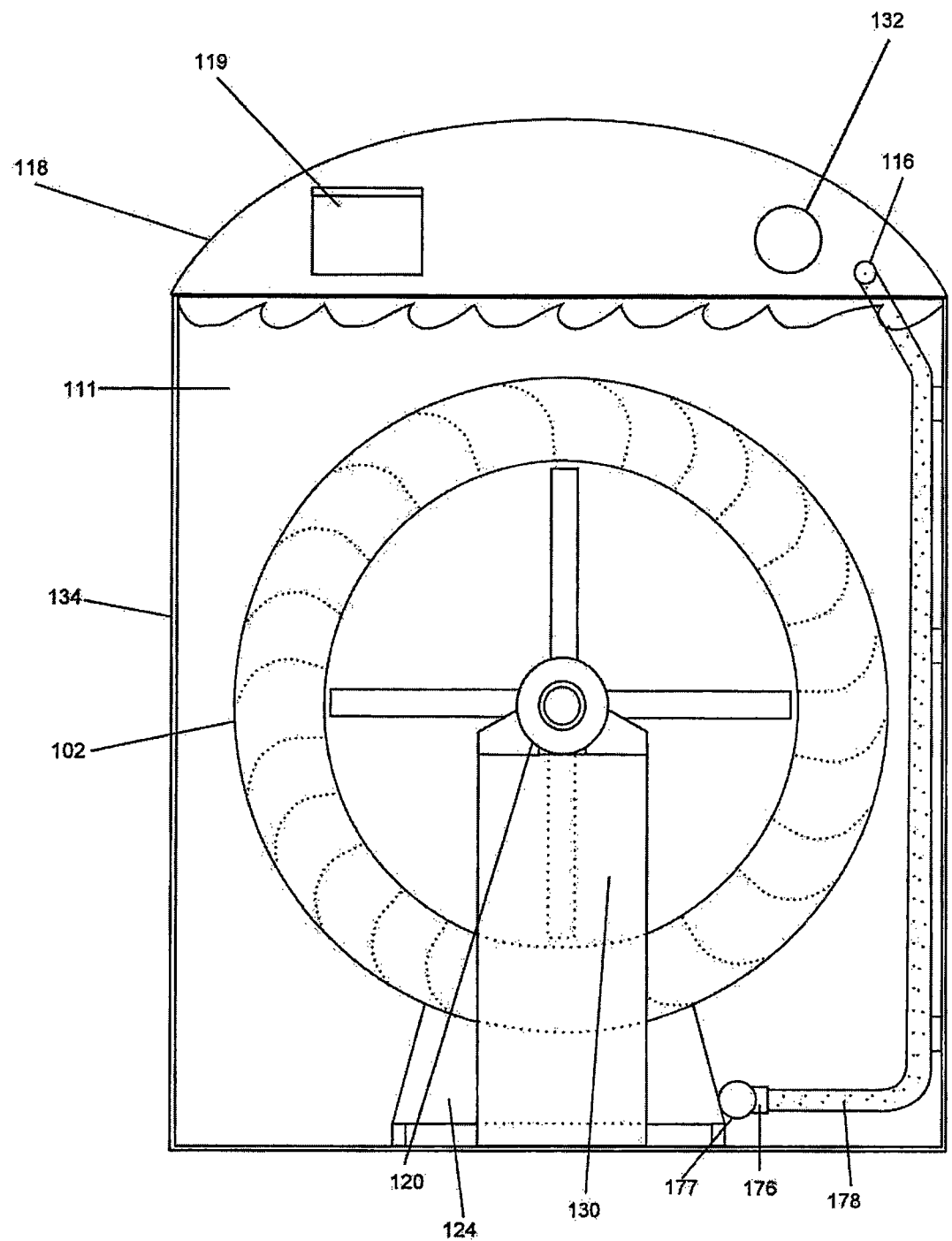
FIG. 5 is a left side end view of the HPC Tank and its internal parts as seen with the end of the Tank removed for illustrative purposes.

FIG. 5 shows the HPC 102 inside the same liquid-tight tank 134 immersed in the drive liquid 111 in a left side view—note that the left side of the tank has been removed for illustrative purposes only. Coupled in a gas-tight manner to the side of the drive gas plenum 124 is a drive gas distribution equalizer chamber 177 which is attached in a gas-tight manner to a gas supply control valve 176 which is fed the drive gas 178 from the terminal end of the thermally insulated drive gas supply line 116. The axle bearing 120 is coupled to the top of the bearing support 130. Additionally, the tank cover 118 can include a thermally insulated drive gas supply line 116 and a drive gas return line 132 extending from the back. Also shown attached to the flat face of the HPC tank cover 118 is a vertically-hung neutrally spring-loaded tank cover pressure relief door 119.

Figure 6:
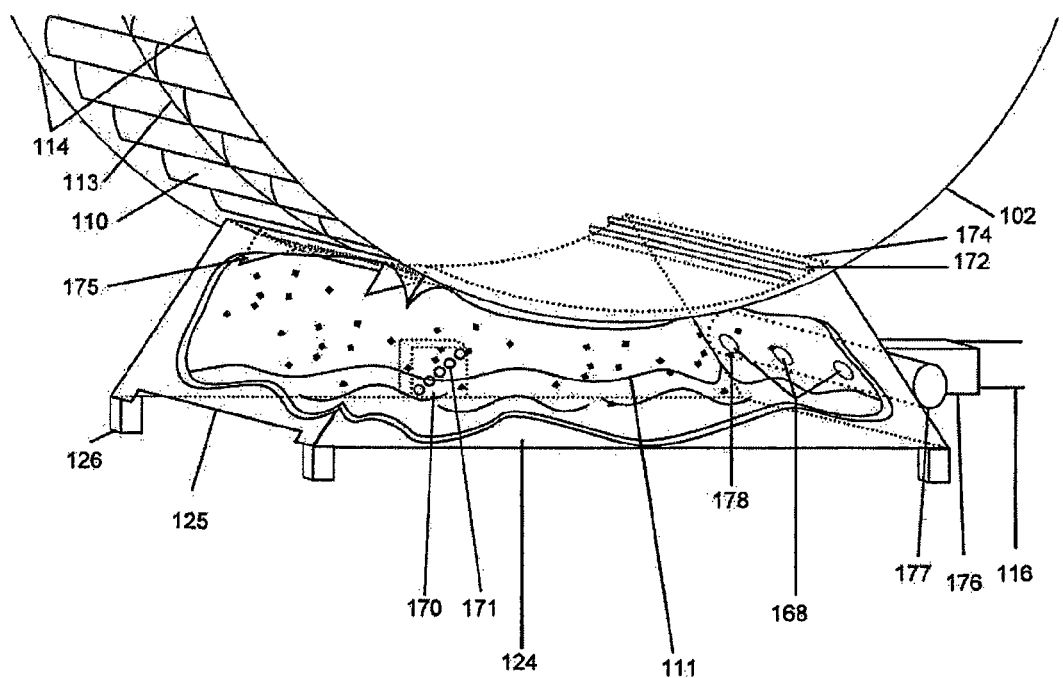
FIG. 6 is a left side perspective view of the Drive Gas Plenum.

In the embodiment of FIG. 6, the operating components of the drive gas plenum 124 are located beneath the HPC 102 with the thermally-insulated drive gas supply line 116 terminating in a gas-tight manner to a gas supply control valve 176. The control valve 176 controls the quantity of drive gas 178 that enters a drive gas distribution equalizer chamber 177. The drive gas distribution equalizer chamber 177 allows the drive gas to expand and equalize the gas pressure within the plenum 124. The drive gas 178 enters the plenum 124 under controlled pressure through the drive gas supply ports 168 and maintains the level of the drive liquid 111 internal to the drive gas plenum 124. Coupled to the upper right and left ends (as shown in FIG. 6) of the drive gas plenum 124 are two seal backer plates 174 supported by multiple seal backer plate supports 175. Coupled to the top-side of each seal backer plate 174 are a series of continuous plenum-to-HPC vane seals 172 (note that three seals 172 as shown in this embodiment—other designs using other numbers of seals 172 are possible dependent on operational depths and forces placed on the seals). Internal to the drive gas plenum 124 is a graduated set of plenum liquid level sensors 171, which disposed at an angle and protected and encased in a liquid level sensor assembly 170. Also shown on the bottom of the drive side of the plenum 124 is a plenum drive gas overflow cutout 125, which will be used to direct the plenum gas overflow to the drive face of the HPC 102 during operational startups. A series of plenum support footers 126 is shown where the footers 126 position the plenum 124 above the tank bottom 129 (not shown in this figure) and in a strategic and advantageous position directly under the HPC 102.

Figure 7:
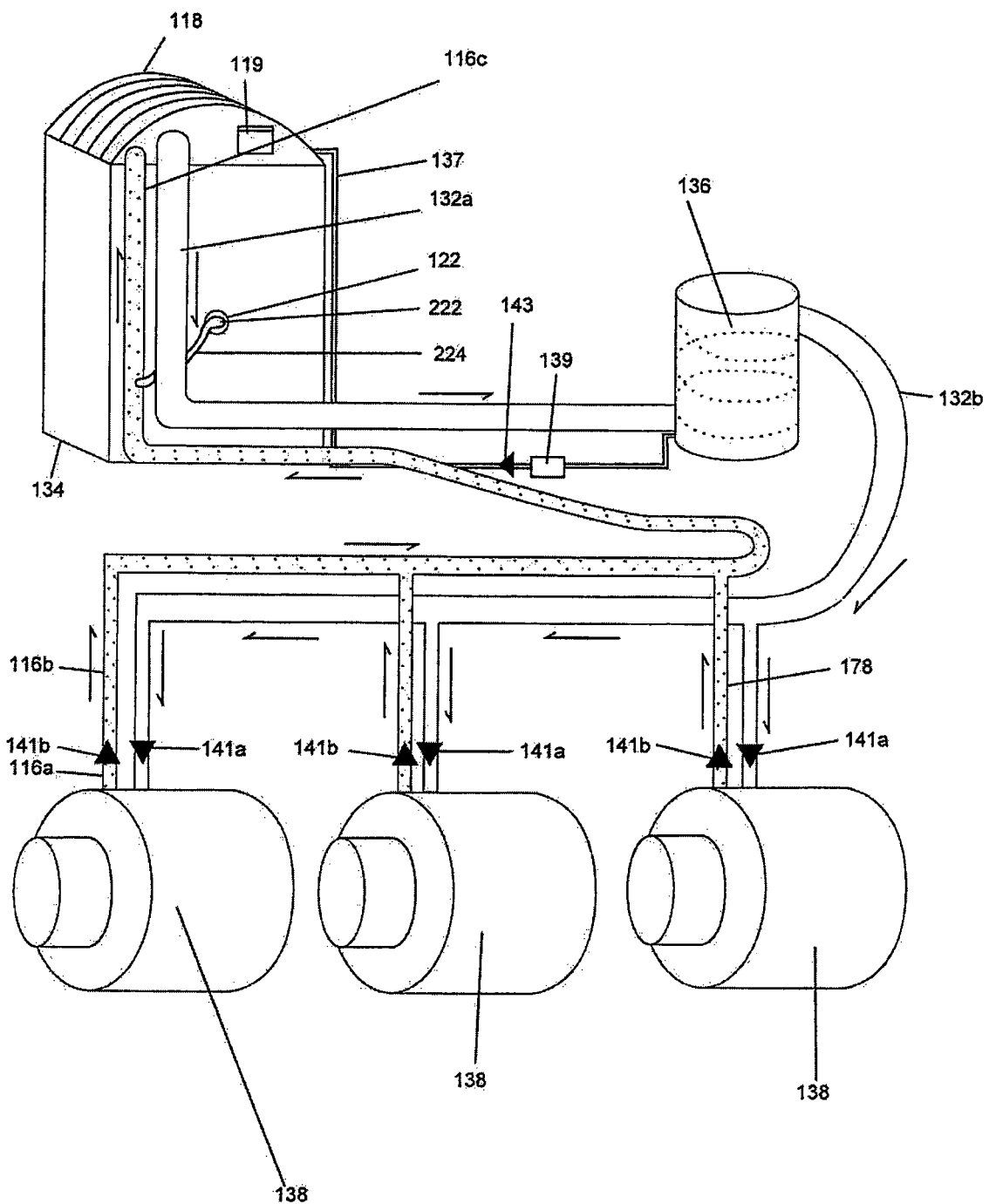
FIG. 7 is a perspective view of the HPC's Drive Gas System as seen from one end of the Tank.

Referring to the embodiment of FIG. 7, an HPC drive gas system comprises a more complex three compressor design including the tank 134 and tank cover 118. All gas piping/plumbing couplings are sealed, thereby preventing any gas leakages. Also shown mounted to the vertical face of the tank cover 118 is the tank cover pressure relief door 119. A gas return line 132a exits the back side of the tank cover 118 and couples to a gas spin filter 136. A gas return line 132b exits the gas spin filter 136 and couples to the input side of a one-way gas check valve 141a.

On the opposite side of the check valve 141a, the gas return line 132b further couples to the input port of a gas compressor 138. A compressed drive gas 178 exits the outlet port of the compressor 138 through a drive gas supply line 116a and passes through the output side of a one-way gas check valve 141b. The compressed drive gas 178 then exits the outlet port of the check valve 141b and continues passing through the remainder of the drive gas supply line 116b. The drive gas supply line 116b can couple to a second drive gas supply line 116c, whereby it is coupled to another compressor's compressed gas output. The drive gas 178 flows into the tank 134, entering through the face of the tank cover 118 (as shown from the right side of the tank 134). The input side of an electrically-powered gas spin filter liquid return pump 139 can be coupled to a small sealed opening defined in the sump-like bottom portion of the gas spin filter 136. The liquid output is thereby coupled to a gas spin filter liquid return one way check valve 143, which couples to a gas spin filter liquid return line 137. The gas spin filter liquid return line can be coupled at its terminal end to an opening defined in the top of the tank 134 above the drive liquid's 111 (FIG. 4) top surface. Also shown is a micro-bubbler intra-axle gas supply line 224 which couples to the drive gas supply line 116c delivering an amount of drive gas (not shown) to the terminal end of line 224. The end of line 224 couples to a intra-axle rotary gas coupler/joint 222 which is coupled to the outer end of the outer drive axle 107 (not shown in this figure) which penetrates the tank 134 through the liquid-tight tank wall seal 122.

Figure 8:
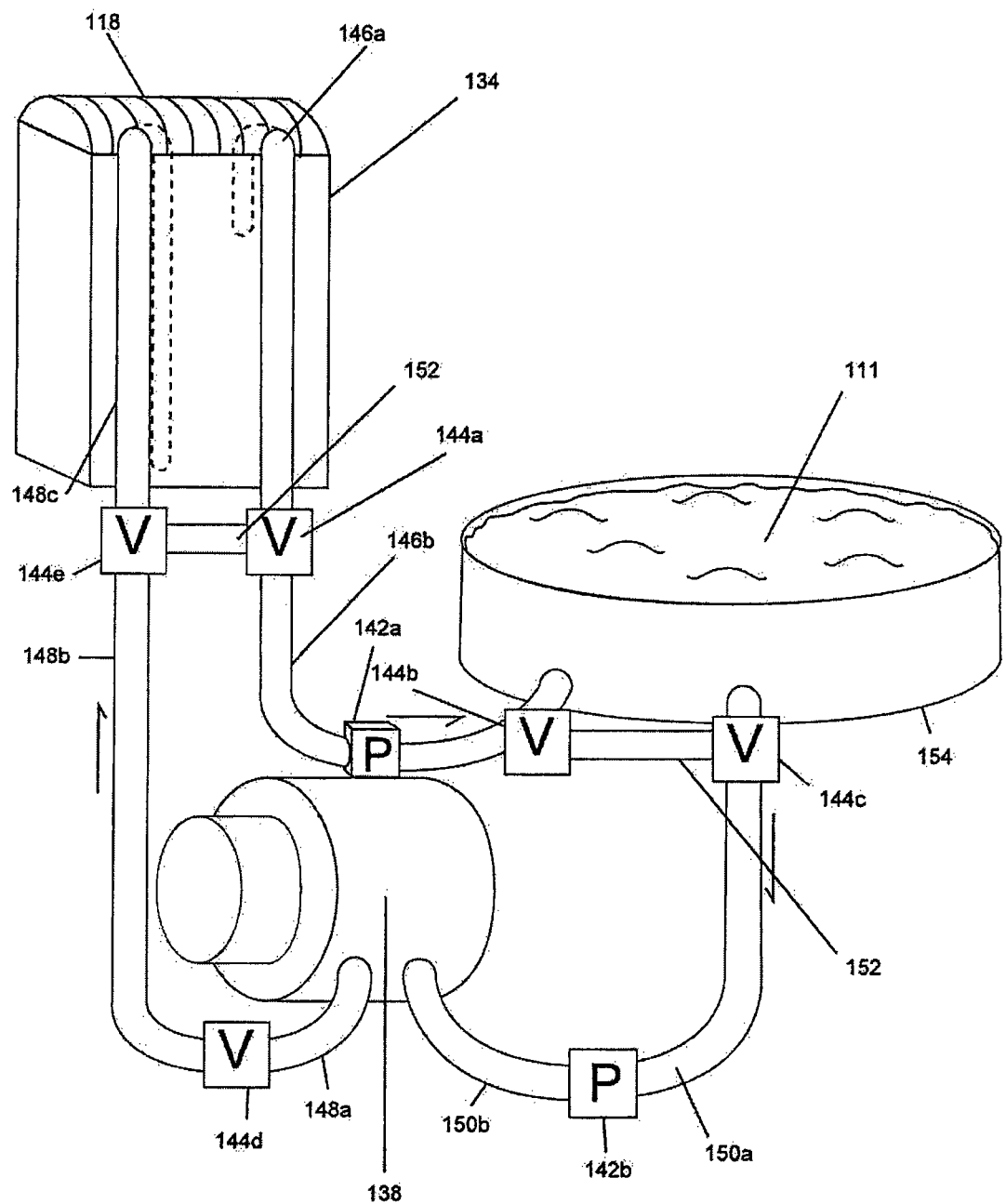
FIG. 8 is a perspective view of the HPC's Thermal Management Drive Liquid System as seen from the front face of the Tank.

In the embodiment of FIG. 8, a liquid-tight HPC thermal management drive liquid system includes a single compressor design. The drive liquid 111 exits the tank 134 through an outlet line 146a, with its inlet mounted near the top of the tank and submerged below the liquid's upper surface. The outlet line 146a is coupled to one of two inlet ports of a two-way HPC liquid flow control valve 144a. The outlet line 146b exits the valve 144a as shown.

Following the drive liquid path of the first liquid flow control valve 144a, the drive liquid continues to the inlet end of an intermediate liquid outlet line 146b which couples line 146b's outlet to the inlet port of a liquid flow pump 142a. This pump 142a moves the drive liquid to the intake of a two-way cooling pool liquid flow control valve 144b which couples one of its outlets to a liquid cooling pool 154 where the drive liquid is pumped to cool and loses its latent heat. The second outlet of the liquid flow control valve 144b directs the drive liquid flow through a cooling pool liquid bypass line 152 which couples to the first inlet of a second two-way liquid cooling pool liquid flow control valve 144c which controls the outlet of the liquid cooling pool 154. The liquid cooling pool 154 is directly coupled to the second of its two inlets of the second two-way liquid cooling pool liquid flow control valve 144c which couples to the inlet side of a liquid inlet line 150a. The liquid inlet line 150a couples with the inlet port of a liquid flow pump 142b, which couples its outlet port to a compressor liquid inlet line 150b. The inlet line 150b terminates at the liquid coolant intake port of a gas compressor 138. The liquid coolant outlet port for the compressor 138 is coupled with a compressor liquid outlet line 148a which couples to the inlet port of the compressor outlet liquid flow control valve 144d which couples its outlet port to a liquid inlet line 148b which couples to the inlet port of the HPC bypass liquid flow control valve 144e. The HPC bypass liquid flow control valve 144e has two outlet ports. The first outlet port couples to a tank liquid inlet line 148c. The inlet line 148c passes through the tank cover 118 and extends to and terminates near the bottom of the tank 134. The second outlet port of the HPC bypass liquid flow control valve 144e couples with the tank liquid bypass line 152. The liquid bypass line 152 couples to the second inlet of the two-way liquid flow control valve 144a.

Figure 9:
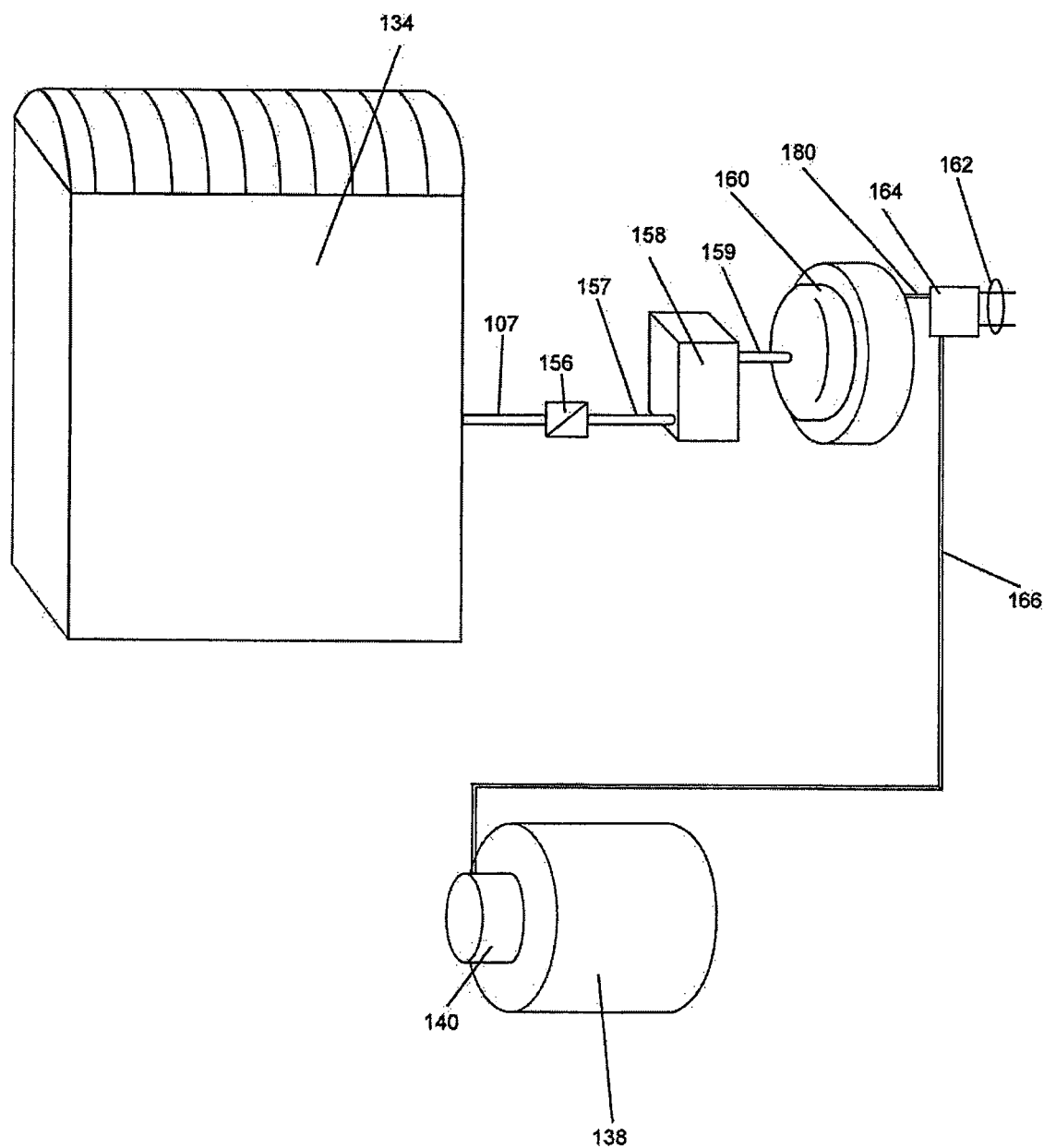
FIG. 9 is a representation of the HPC used in a Power Production System as seen from the face side of the Tank.

In FIG. 9, the HPC is incorporated in a single output power production system with a single compressor design. The outer drive axle 107 exits the tank 134 as previously described and is coupled to the power input side of a power/torque-overload releasable HPC drive axle power release coupler 156. The power release coupler 156 outlet side is coupled to a power shaft 157 which is coupled to a step-up gear box 158. The gear box 158 is coupled to the intermediate power shaft 159 which drives an alternator/generator 160. A plurality of power lines 180 exits the alternator/generator 160 and couples to an electrical outlet control system 164. The electrical outlet control system 164 feeds both a compressor supply line 166 which couples with a compressor drive motor 140 of a compressor 138 and feeds excess electrical power not required by the HPC system through an electrical output service line 162.

Figure 10:
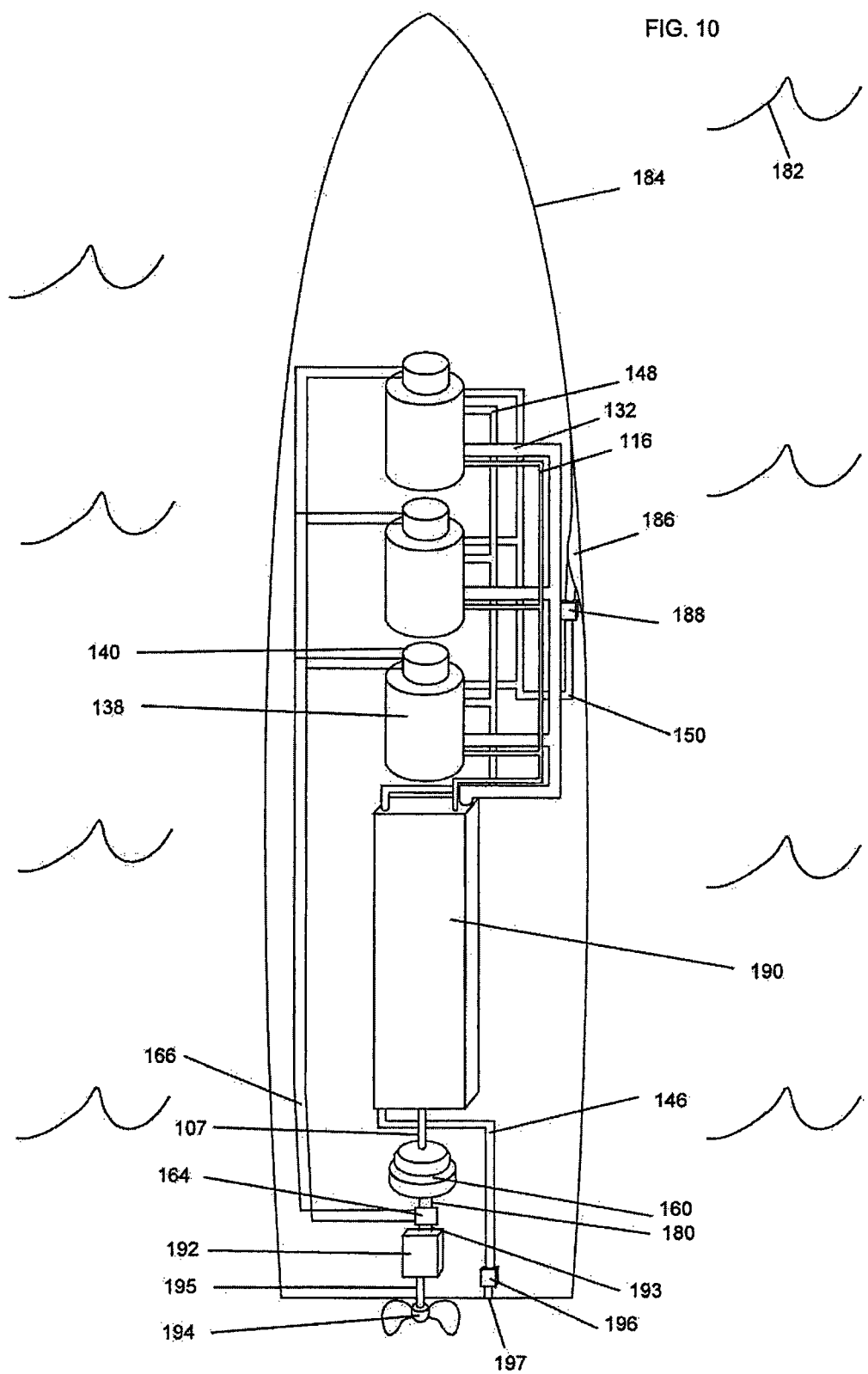
FIG. 10 is a top-down system view of a HPC as used in a naval propulsion/drive system.

In FIG. 10, a naval power application is shown where contained inside a ship hull 184, a sealed HPC tank system 190 with an internal HPC (not shown) through the outer drive axle 107 drives an alternator/generator 160 which is coupled to alternator/generator power output lines 180 and an electrical output control system 164 (note that this embodiment directly couples the HPC to the alternator/generator. Dependent on the end use power requirements, size of the HPC, etc., different embodiments can use direct drive designs or geared designs). Electrical power lines 193 run from an electrical output control system 164 to a ship drive motor 192. A plurality of compressor electrical power supply lines 166 couple the compressor drive motors 140 and the ship's compressors 138. The ship drive motor 192 drives a propeller shaft 195 and a propeller 194.

An intake 186 feeds an amount of outside water 182 to a compressor inlet pump 188 which is coupled to the compressor 138 by a liquid inlet line 150. There can also be a plurality of compressors 138 as shown. From the compressor 138, the HPC liquid inlet line 148 couples to the tank 190. Connected to the aft of the tank 190 is the HPC liquid outlet line 146 which is coupled to a water system outlet valve 196. The outlet valve 196 terminates with the ship's hull 184 where the water 182 exits the hull through a water outlet port 197. The compressor 138 is coupled to the drive gas supply lines 116 which are then coupled to the sealed HPC tank system 190. Gas return lines 132 exit the tank system 190 and couple to the gas inlet side of each of the compressors 138.

Figure 11:
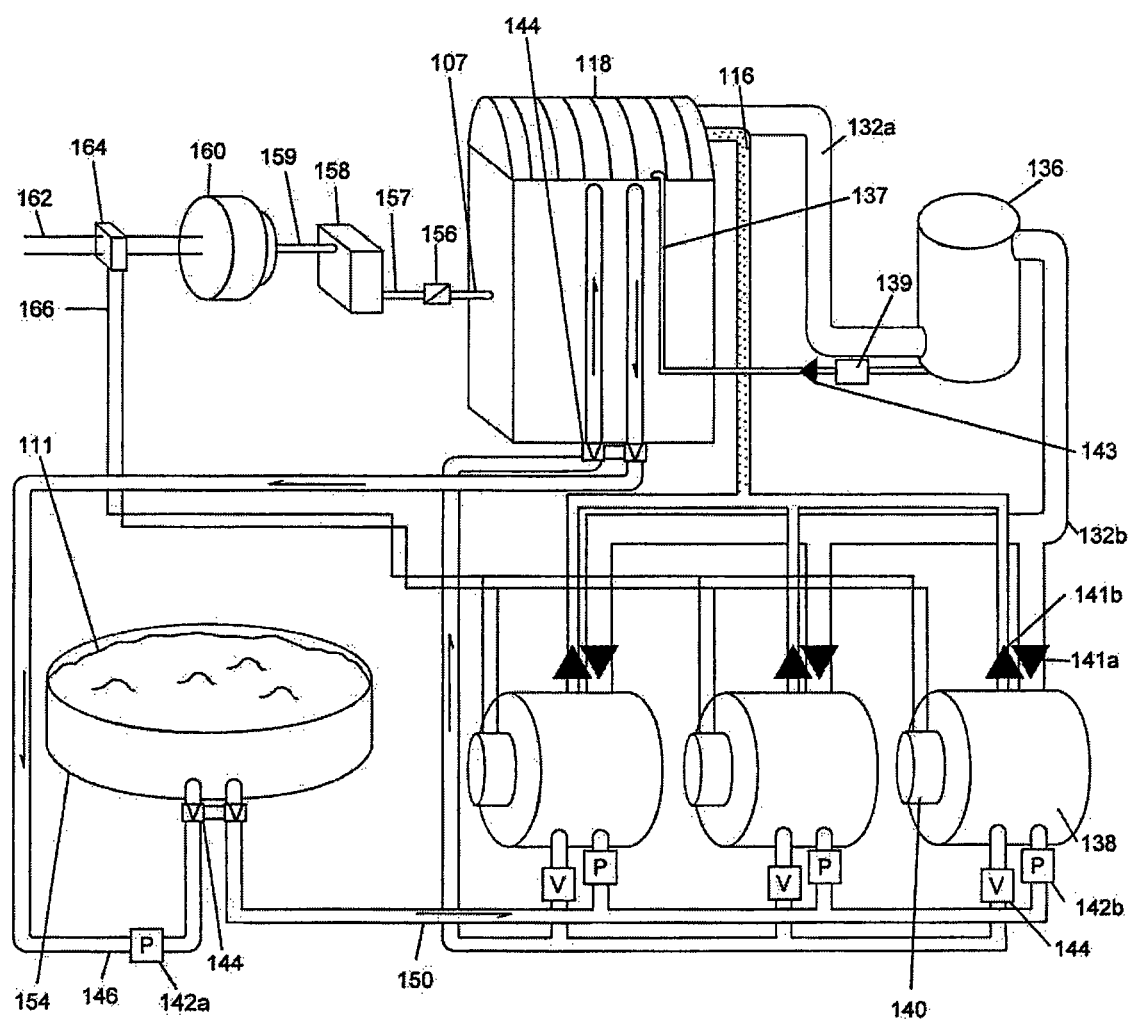
FIG. 11 is a system view of a complete HPC system as seen from the front face side of the Tank.
Figure 12:
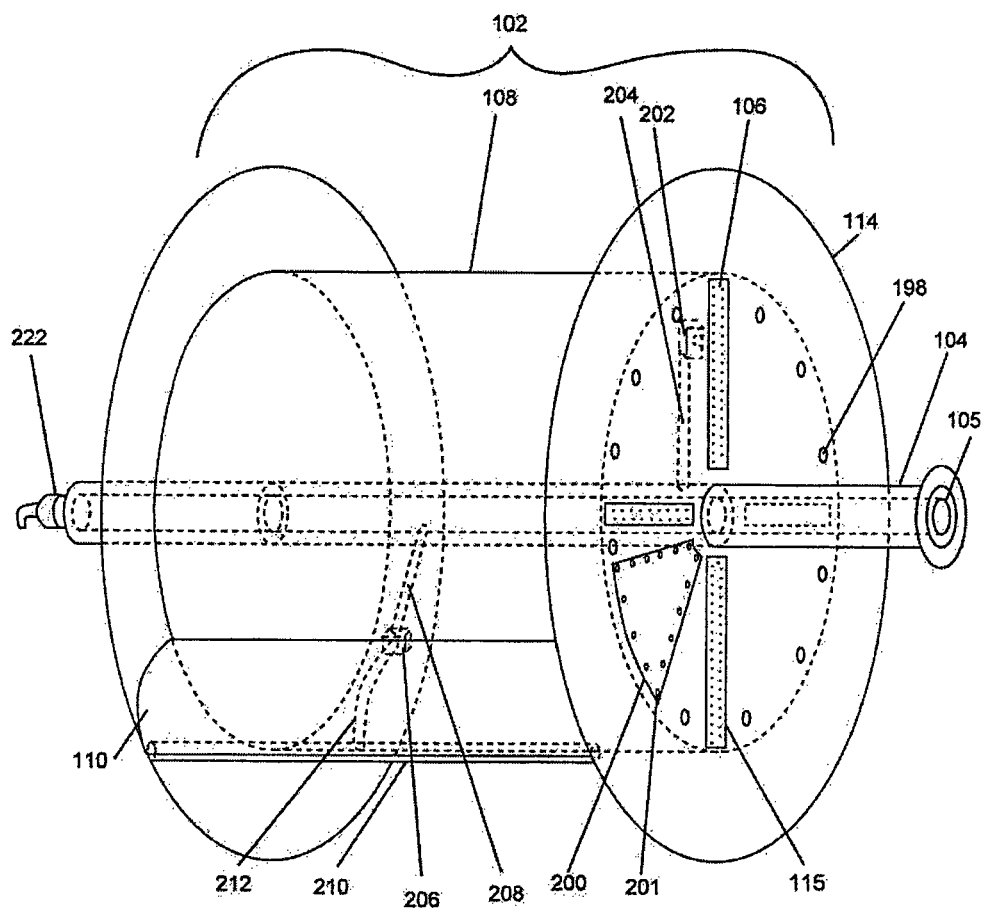
FIG. 12 is a drive side perspective view of the HPC (minus most vanes) and the general Micro-Bubbler design.

Referring to FIG. 11, a complete HPC system includes a single output shaft and a three compressor design. Turning to FIG. 12, the components of a micro-bubbler system are provided. A hollow drive axle 104 running through the HPC 102 supplies pressurized gas through a central gas passageway 105 into the axle 104 core. An intra-axle rotary gas joint 222 is mounted on the non-drive end of the drive axle 104 and couples the compressors supplying pressurized micro-bubbler gas for micro-bubble injection. Interior to the HPC core support 108, the axle's gas passageway 105 is coupled and supplies this micro-bubbler gas through an end-plate axle-to-regulator service line 204 which couples and supplies this same micro-bubbler gas to the inlet of an end-plate depth-variable pressure regulator 202. The pressure regulator 202 is mounted to the interior wall of a HPC end plate 114. The regulated gas outlet of the pressure regulator 202 passes pressure-regulated micro-bubbler gas through the end-plate's micro-bubbler radial cutout slot 115 and then into the back of an end-plate micro-bubbler 106. Each HPC 102 has a plurality of micro-bubblers 106 incorporated radially into the end plates 114, the exact number of which is dependent on the design optimized for each specific operational need. Micro-bubbler gas is emitted through minute gas passageways 214 (FIG. 14) into the drive liquid 111 (not separately shown) to reduce parasitic hydro-dynamic drag forces.

Also interior to the HPC core support 108, the hollow drive axle's 104 central gas passageway 105 is coupled and supplies pressurized micro-bubbler gas to the inlet of an axle-to-vane pressure regulator service line 208 which is coupled to and supplies pressurized micro-bubbler gas to the inlet side of a vane depth-variable pressure regulator 206. The pressure regulator 206 is coupled and supplies pressure-regulated micro-bubbler gas to a vane pressure regulator micro-bubble service line 212 where the output of the line 212 supplies regulated micro-bubbler gas to the back side of a vane micro-bubbler 210. The vane micro-bubbler 210 has multiple minute micro-bubble gas emitter passageways 214 (FIG. 15) which emit the micro-bubbles into the drive liquid 111 (not separately shown) to reduce parasitic hydro-dynamic drag forces. The vane micro-bubbler is mounted to the HPC vane 110 in a hydro-dynamically flowing low-drag manner.

Service to the HPC's internal parts is made through a HPC end-plate access door 200 which is attached to the end-plate 114 with multiple HPC end-plate access door attachment bolts 201. The end-plates 114 have multiple equally spaced pressure equalizer holes 198 perforating the end-plates 114 so as to equalize the pressures inside and outside the cylindrically-shaped cavity made by the HPC core support 108 and end-plates 114.

Figure 13:
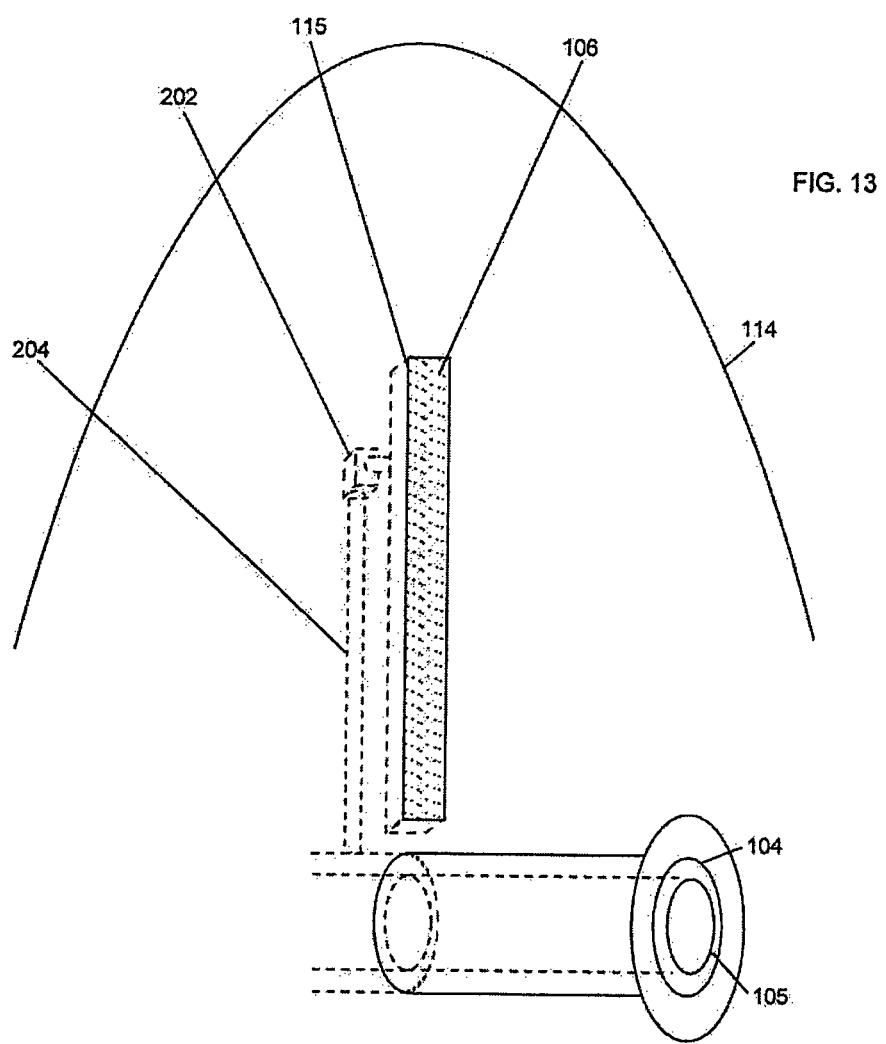
FIG. 13 is a perspective view of an End-Plate Micro-Bubbler, Regulator, and its Gas Supply Line.

FIG. 13 shows the end-plate micro-bubbler parts. A hollow drive axle 104 supplies drive gas 178 through a central gas passageway 105 in the axle 104 core. Internal to the HPC's structure, the axle's gas passageway 105 is coupled to an end-plate axle-to-regulator service line 204 which couples to an end-plate depth-variable pressure regulator 202. The pressure regulator 202 is mounted to the interior wall of a HPC end plate 114. The pressure regulator 202 passes drive gas 178 (not shown in this figure) through the HPC end plate 114 and micro-bubbler radial cutout slot 115 into the back of the flush-mounted end-plate micro-bubbler 106. Each HPC has multiple micro-bubblers incorporated radially into the end plates, the exact number of which is dependent on the design which is optimized for each specific operational need.

Figure 14:
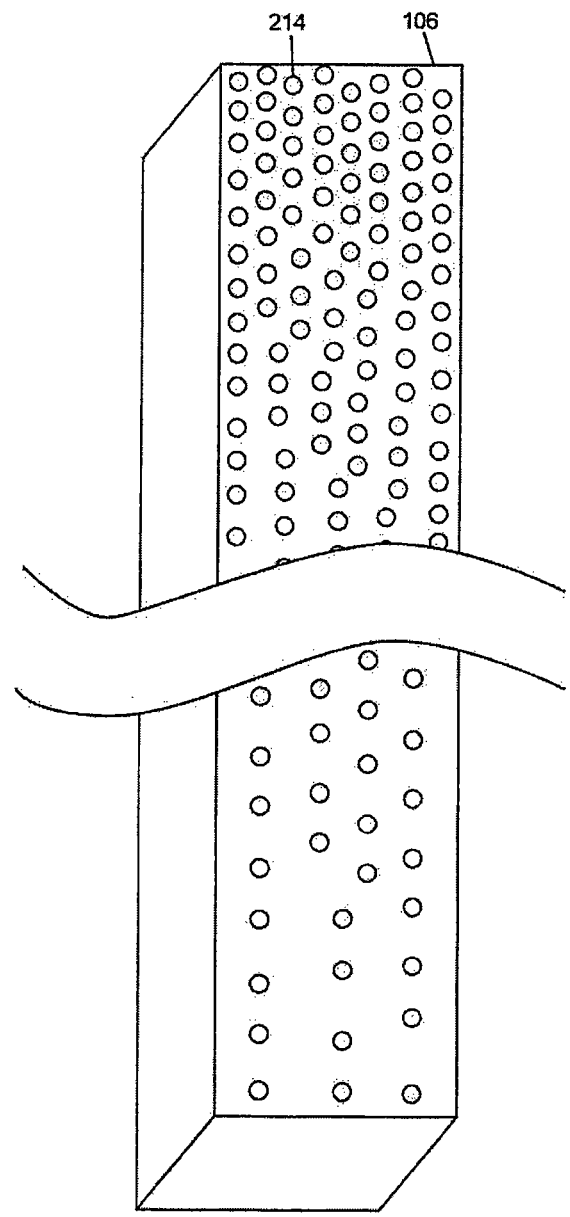
FIG. 14 is a perspective view if the End-Plate Micro-Bubbler and its gas emitter perforations.

In FIG. 14, an end-plate micro-bubbler includes an end-plate micro-bubbler section 106 with multiple minute micro-bubbler gas emitter passageways 214 defined through its face. The distal end (furthest from axle) of the end plate micro-bubbler 106 can have more emitter passageways 214 micro-drilled therein than the proximal end (closest to the axle) which will allow generation of more micro-bubbles at that distal end.

Figure 15:
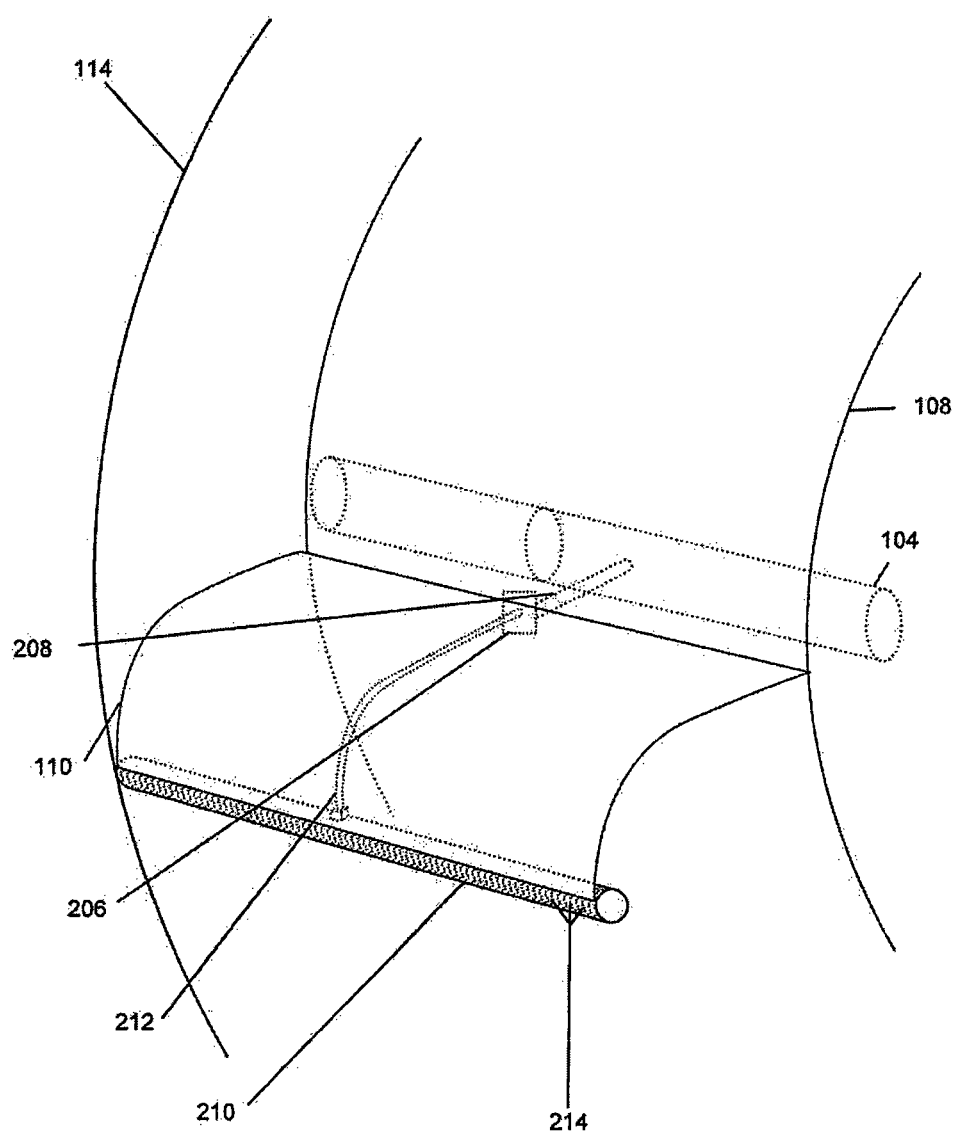
FIG. 15 is a partial drive side perspective view of the Vane Micro-Bubbler, Regulator, and its Gas Supply Lines.

Referring to FIG. 15, a vane micro-bubbler includes a HPC vane 110 coupled to a HPC end-plate 114 and HPC core support cylinder 108 where the vane 110 has a hollow vane micro-bubbler 210 with numerous minute micro-bubbler gas emitter passageways 214. The vane micro-bubbler 210 is coupled to the edge of the vane in a low drag manner, where the vane micro-bubbler 210 is coupled even with the outside facing edge of the vane 110 presenting a low-drag design. The hollow axle 104 is coupled to an axle-to-vane pressure regulator service line 208 which is coupled to a vane depth variable pressure regulator 206, such that the regulator's outlet is coupled to the vane pressure regulator to vane micro-bubbler service line 212. The vane micro-bubbler service line 212 terminates in connection to a vane micro-bubbler 210 where depth-regulated micro-bubbles are evenly emitted to reduce parasitic drag reduction on the operational HPC.

Figure 16:
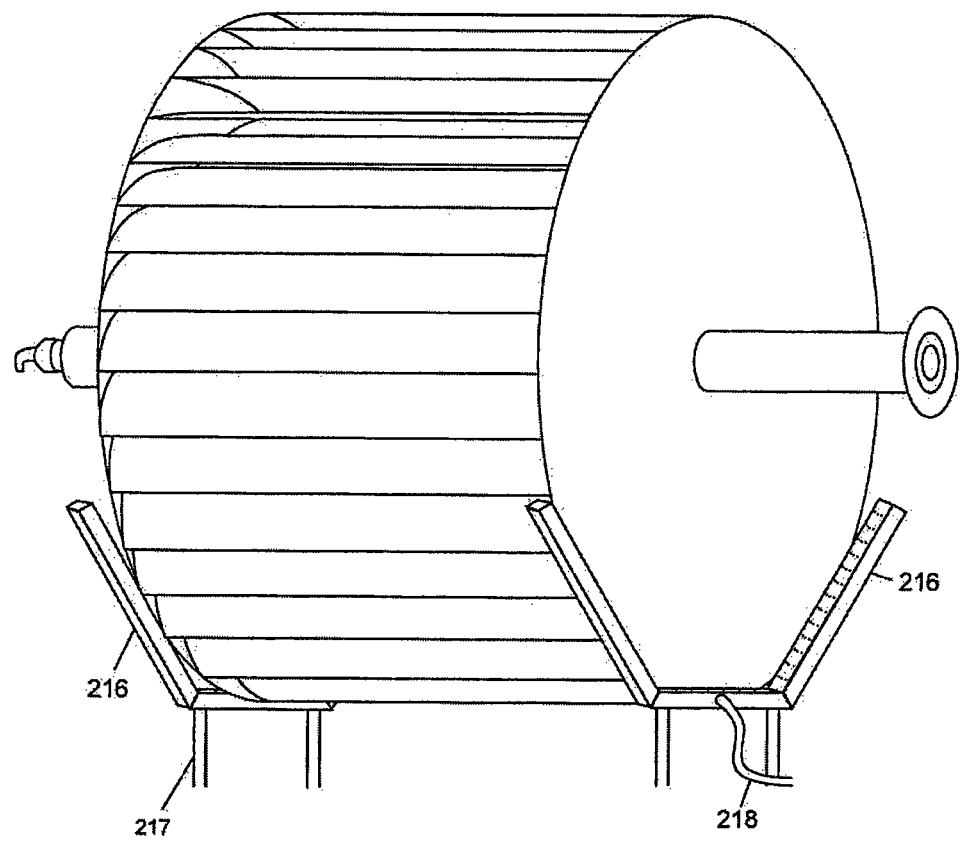
FIG. 16 is a drive side perspective view of the HPC in general detailing the 'Small HPC' Static End-Plate Micro-Bubbler Design.

Turning to FIG. 16, a 'small HPC' design is provided which uses longitudinally running vane micro-bubblers 210 along HPC vanes 110 and a static end-plate micro-bubbler design (note the vane intermediate support has been omitted for illustrative purposes). Smaller HPC designs can utilize a static HPC End-plate micro-bubbler system in lieu of an end-plate micro-bubbler system internal to the HPC core. The static micro-bubble system is comprised of several hollow static end-plate micro-bubbler 216 sections being joined together and strategically and advantageously mounted on a series of static end plate micro-bubbler support legs 217 in a fixed location adjacent to the lower outward-facing edges of the HPC end plates 114. The micro-bubble gas is provided to the micro-bubbler 216 through a static end-plate micro-bubbler service line 218.

Figure 17:
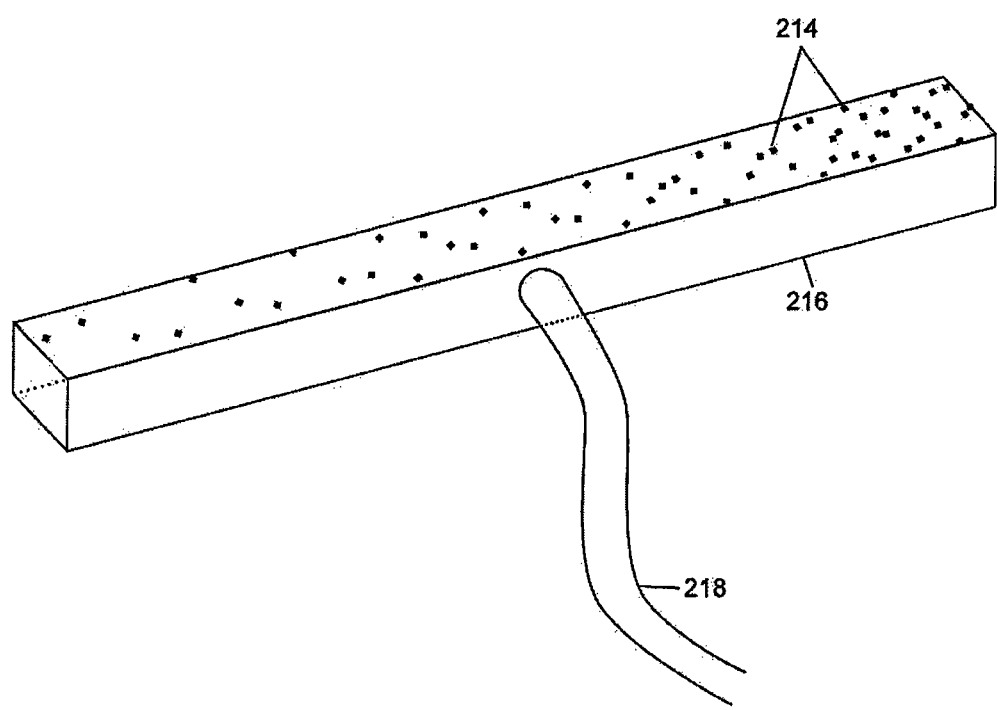
FIG. 17 is a perspective view of a section of a Static End-Plate Micro-Bubbler Emitter.

FIG. 17 shows details of the static micro-bubbler where a hollow static micro-bubbler section 216 has minute micro-bubbler gas emitter passageways 214 drilled along its upper surface, allowing micro-bubble gas to enter the drive liquid 111 (not shown) as streams of micro-bubbles. Depicted is the varied amount of micro-bubble emitter passageways 214, the number of which is based on the amount of micro-bubbles needed at differing locations along the length of the specific micro-bubbler section. The number and location of these passageways 214 can vary for different embodiments. Also shown is a static end plate micro-bubbler service line 218 which is connected to and provides gas to the micro-bubbler section 216.

Figure 18:
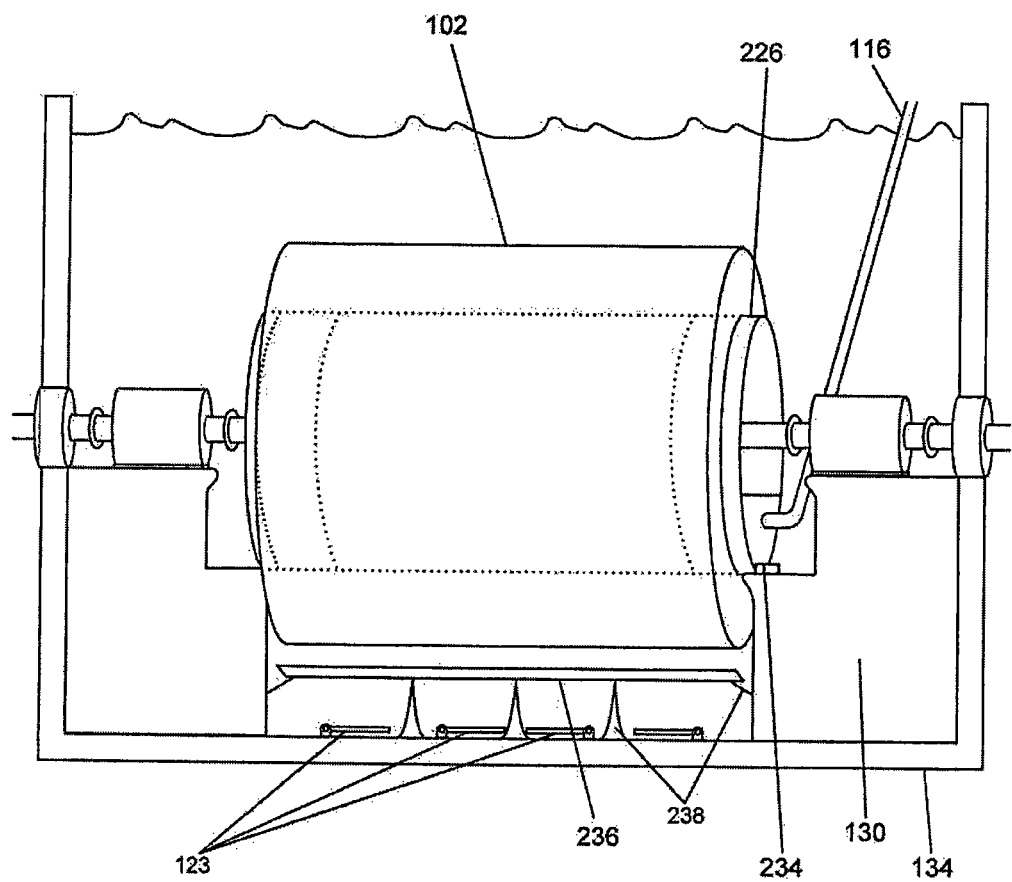
FIG. 18 is a perspective view of a HPC utilizing Rotary Valve Direct Gas Injectors.

FIG. 18 shows the HPC utilizing a set of two Rotary Valve Direct Gas Injectors. The HPC 102 has placed in each of its ends but not attached to the HPC proper, a pair of HPC Rotary Valve Recesses (not separately shown). In each recess a rotary valve body 226 is fitted but not connected to the HPC 102 proper. Each static rotary valve 226 is coupled to the tank's HPC bearing support 130 by a singular or set of rotary valve support flanges 234. The rotary valve is attached to the thermally insulated drive gas supply line 116. Located near the bottom of the tank and strategically and advantageously positioned are a set of external baffles 236, held place by baffle-to-tank supports 238 which held the baffles static in relation to the tank 134 and the in-motion HPC 102. Also shown coupled to the bottom of the tank 134 are a set of rotatable/folding HPC maintenance support stanchions 123.

Figure 19:
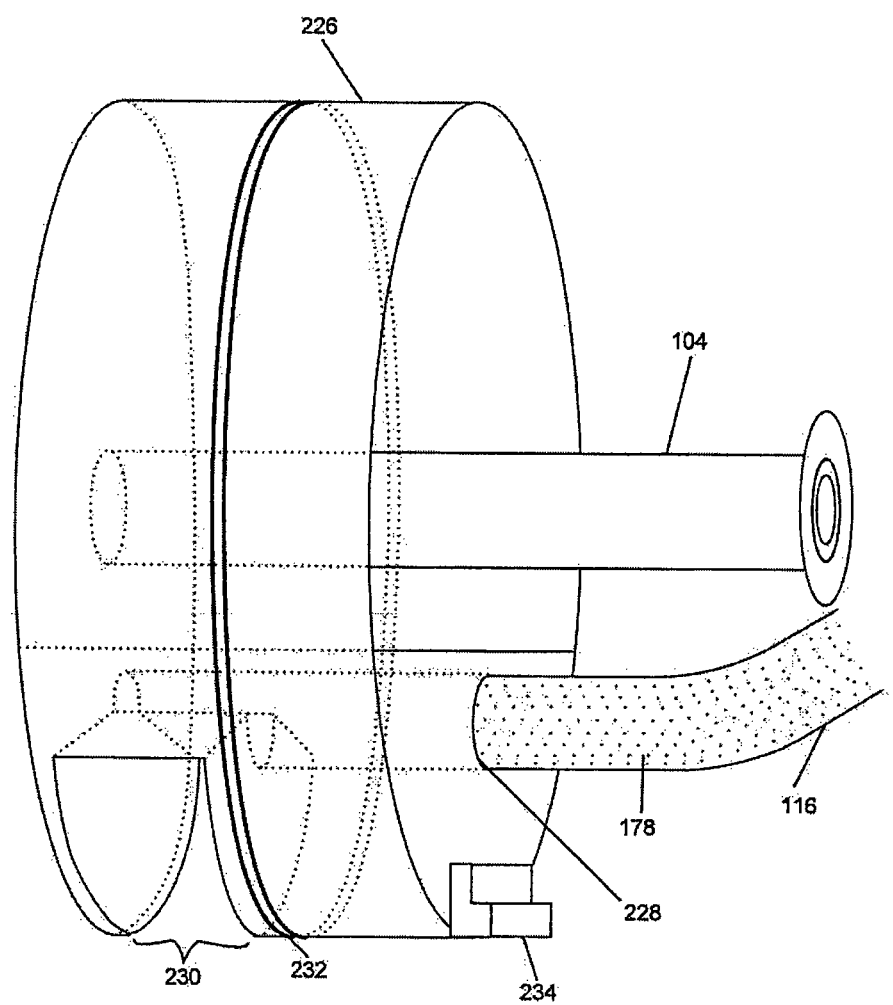
FIG. 19 is a perspective view of a Rotary Valve Direct Gas Injector.

In FIG. 19, the Rotary Valve Direct Gas Injector assembly is shown in greater detail. A rotary valve body 226 is a solid single piece structure. The rotary valve body 226 has built into its curved rotary face a single or plurality of rotary valve-to- HPC seals 232 that contain the gases inside the HPC's buckets 109 (not shown in this figure). Other forms of seals are also envisioned such as use of specifically dimensioned close tolerance gaps between the HPC and the rotary valve body 226, lip seals, and other forms of retaining the drive gas 178 (not shown in this figure) inside the HPC-to-rotary Valve body face. The outer face of the rotary valve body has a rotary valve gas passageway 228 that extends from the outer face of the rotary valve body to the proximal inside face of a rotary valve gas emission orifice 230. The rotary valve gas passageway 228 couples the thermally insulated drive gas supply line 116 to the rotary valve gas emission orifice 230, supplying drive gas to the HPC. The rotary valve gas emission orifice is specifically shaped to have a sized opening of so many degrees of arc in relation to the rotary valve body 226 circumference so as to allow a specific metered drive gas 178 charge to be injected into the HPC buckets as they pass by the orifice. The longer the arc of the opening, the longer the duration of the filling time of the specific HPC design.

Several factors affect the amount of gas passed into the HPC buckets: the size of the orifice; the drive gas pressure; gas delivery line restrictions such as friction, line bends, line size, etc.; and the speed of rotation of the HPC. FIG. 19 depicts the axle 104 as a point of reference—the depicted rotary valve body 226 does not touch the drive axle 104, however, other non-depicted embodiments can have the axle 104 pass through a close tolerance air bearing-type journal if more application-dependent HPC-to-rotary valve interface structure is necessary. A rotary valve support flange 234 is depicted as a means to rigidly hold the rotary valve in place on the tank's HPC bearing support 130 (not shown in this figure). Other non-depicted forms of holding the rotary valve static are available. Other non-depicted rotary valve body embodiments include using a substantially sized rotary valve body 226 as an air bearing, where such a design can eliminate the need for additional HPC axle bearings.

Figure 20:
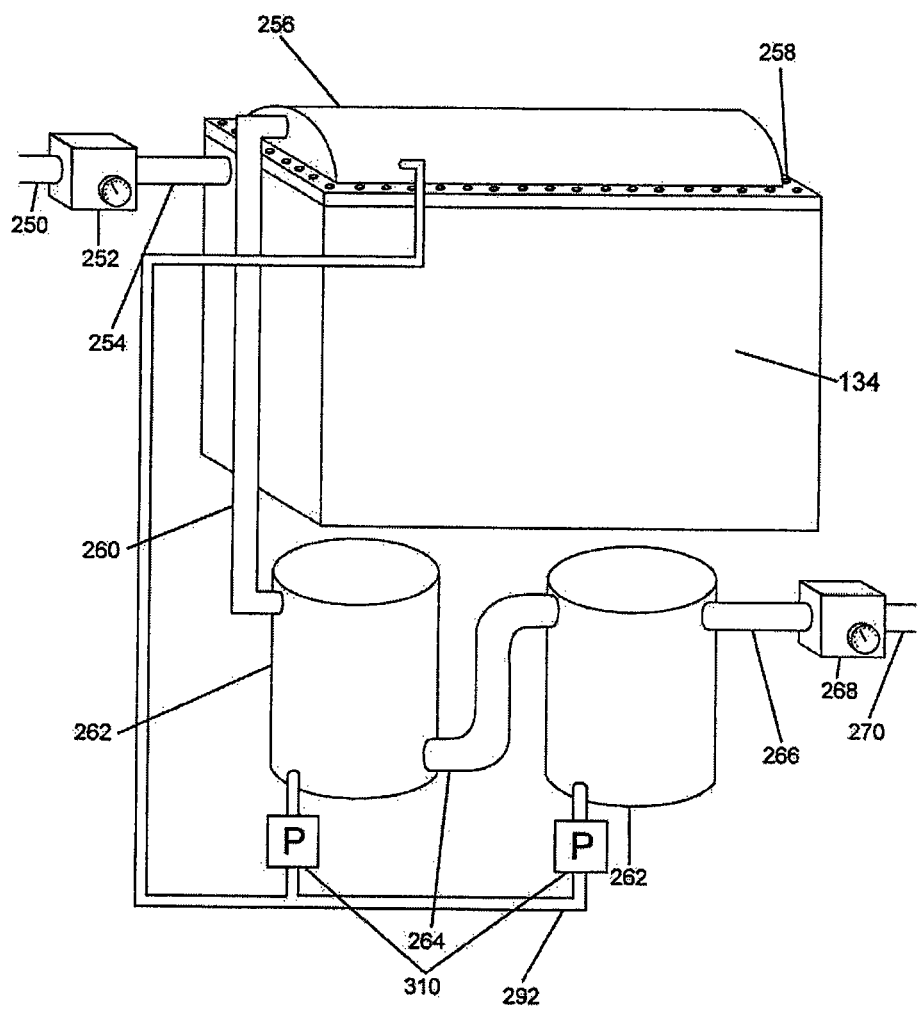
FIG. 20 is a perspective view of a HPC operated using Pressurized Natural Gas Drive System.

FIG. 20 shows an HPC being driven and operated using pressurized natural gas. The tank 134 holding the HPC 102 (as shown in FIG. 4 or FIG. 18) has a substantial tank cover 256 retained by a series of appropriately sized tank cover bolts 258. High pressure natural gas enters the tank 134 through a natural gas high pressure inlet line 250 that is coupled to a natural gas pressure regulator 252 that reduces the natural gas inlet pressure to the designated working pressure for the specific HPC system/application. A regulated natural gas inlet line 254 delivers the natural gas from the outlet of the regulator 252 to the thermally insulated HPC drive gas supply line inside the tank for HPC operations. After the natural gas has driven the HPC and is available above the upper surface of the drive liquid 111 (FIG. 4) inside the tank 134, the used natural gas is evacuated from the tank 134 through a natural gas HPC outlet line 260 to a single or multiple set of natural gas/drive liquid separators 262 passing between separators 262 through an intermediate natural gas line 264. The separator(s) 262 remove the drive liquid vapors from the natural gas to the extent the natural gas meets appropriate specifications for further utility by natural gas end use customers. Not shown is a separate mounted drive liquid thermal management system where thermal energy can be added to the drive liquid 111 to maintain the drive liquid temperature in the face of continuously expansive drive gases internal to the tank 134.

The drive liquid removed by the separator is returned to the tank 134 from the base of the separator 262 connected through the inlet of a drive liquid condensate return line 292 which continues into the inlet of a drive liquid return pump 310. The pumps 310 outlet sends the drive liquid condensate 294 through the continuing return line 292 which terminates at the top edge of the tank 134 where the condensate 294 is deposited above the drive liquid surface (not shown) inside the tank 134. The natural gas leaves through a separator natural gas outlet line 266 which is coupled to a natural gas post-separator pressure regulator 268 which is coupled to a natural gas post-HPC outlet service line 270. The outflow of natural gas from the service line 270 is subsequently delivered to end use customers. Another non-depicted design has a natural gas booster pumping station return the natural gas to the pre-HPC pressure levels, allowing continued transmission of the natural gas through the original transmission modes. The HPC Natural Gas Drive System is automatically controlled by a conventional control system such as those used in water treatment plants and petro-chemical plants.

Figure 21:
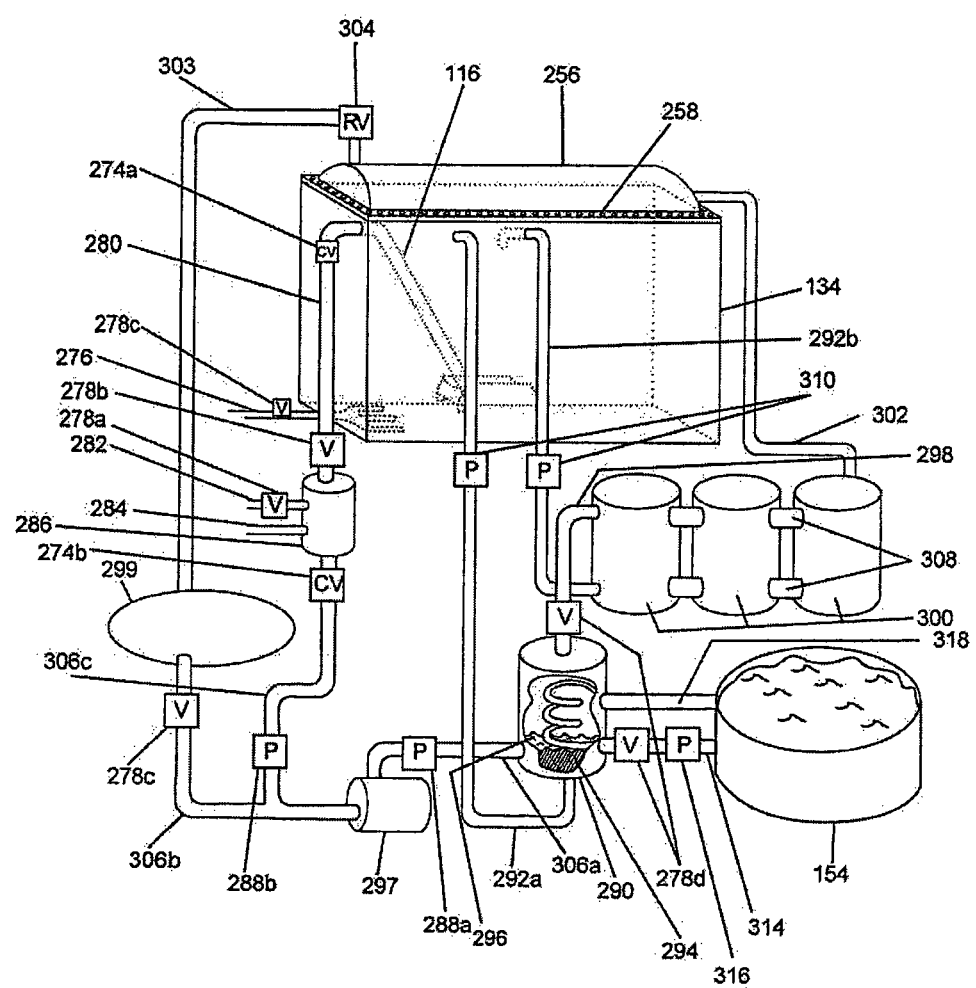
FIG. 21 is a perspective view of a HPC operated using a Binary Gas Drive System.

In the embodiment of FIG. 21, an HPC is operated through use of a Binary Gas Drive System using any available heat source. A standard HPC 102 (as shown in FIG. 4 or FIG. 18) using either a drive gas plenum 124 (FIG. 4) or a rotary valve body 226 injection system (FIG. 18) is submerged in a drive liquid 111 (not shown in this figure) inside a tank 134 with a reinforced tank cover 256 coupled to the tank 134 by a series of substantial reinforced tank cover hold-down bolts 258. A tank heater circuit 276 heats the tank's 134 drive liquid to the optimal operating temperature and is comprised of pumping a heated liquid through a pipe system that delivers radiated heat through the associated tank heater circuit 276 piping and a control valve 278c.

The heart of the binary system is its use of a low boiling point liquid in a closed-loop system comprised of an evaporator 286 and a condenser 290 and associated coupled piping, valves and pumps. Such a binary system is standard and commonly known such as seen in geo-thermal electrical power plants in the United States and Europe. An evaporator 286 receives heated liquid which travels through a closed circuit through the evaporator 286. The heated liquid enters the evaporator 286 through a thermal source input line 282 and a control valve 278a, travels through the evaporator's internal closed heating circuit (not shown) and departs the evaporator 286 through a thermal source return line 284. This heated liquid transfers an operationally significant portion of its thermal energy to a binary liquid. The binary liquid gasifies inside the evaporator 286 and leaves the evaporator through a coupled binary drive gas input line 280, a coupled binary gas control valve 278b, and one-way check valve 274a. The drive gas input line leaving the check valve 274a delivers the binary drive gas to a coupled and thermally insulated drive gas supply line 116 for HPC operations.

After the binary drive gas has run through the HPC, the gas is evacuated from the tank 134 through use of a binary drive gas HPC outlet line 302 which is coupled to a single or series of binary drive gas/drive liquid distillation separators 300. A multiple set of separators 300 is shown in this embodiment. The combined binary drive gases and drive liquids travel successively through the separators 300 through a set of intra-separator gas/liquid lines 308 positioned at the tops and bottoms of the separators. The binary drive gas departs the separator(s) coupled through a binary drive gas condenser input line 298, coupled through a control valve 278c, which is coupled to the binary system condenser 290. Inside the condenser 290 is a closed circuit condensing coil. A condenser coolant flows from a liquid cooling pool 154 which is coupled to a condenser coolant input line 314, coupled to a condenser coolant pump 316, another control valve 278d, and into the condenser 290. After absorbing the thermal energy from inside the condenser 290 while moving through the condenser's closed circuit, the condenser coolant then leaves the condenser coil and which is coupled to a condenser coolant return line 318, which terminates back in the coolant pool 154. Inside the condenser 290, the binary drive gas condenses into binary liquid condensate 296 and trace amounts of drive liquid condensate 294. The binary liquid condensate 296 is drawn off the bottom of the condenser 290 by a connected binary liquid line 306*a* which is coupled to the condenser 290. The opposite end of the binary liquid line 306*a* is coupled to a binary liquid pump 288*a* which pumps binary liquid 296 out the other end of the line 306*a* into a binary liquid storage tank 297. The sump of the binary liquid storage tank 297 is coupled to another binary liquid line 306*b* whose other end is coupled to another binary liquid pump 288*b*, which is coupled to another one-way check valve 274*b* whose outlet feeds back into the evaporator 286. Connected to the top of the reinforced tank cover 256 sits a tank over-pressure relief valve 304 whose outlet end is coupled to a binary gas pressure relief line 303 which is coupled to a binary gas pressure relief tank 299. Connected to the bottom of the pressure relief tank 299 is another binary liquid line 306*b* where the opposite end is coupled to another control valve 278*e*, which is coupled another binary liquid line 306*c* that connects with the binary liquid line 306 that leaves the base of the binary liquid storage tank 297.

A combination of lines 306 which then feed their binary fluid 296 into the inlet of a check valve 274*b* and enter the evaporator 286 to begin the binary system process anew. Also shown coupled to the side of the condenser 290 is a drive liquid condensate return line 292*a* that feeds drive liquid 294 into the input side of a drive liquid return pump 310. The output of the pump 310 is fed into a continuation of return line 292*a* whose terminal end deposits the drive liquid condensate 294 into the inside of the top of the tank 134. Shown also, connected to the base of the last separator 300 is a drive liquid return line 292*b* which leads to the input side of another drive liquid return pump 310. The outlet side of this second pump 310 is connected to the continuation of the separator's drive liquid return line 292*b* who's terminal end deposits separator-based drive liquid condensate 294 into the inside of the top of tank 134. This Figure depicts only one variation of the binary system. Not depicted are various other means of providing condenser cooling such as cooling towers, evaporative coolers, and chiller units. The HPC Binary Drive System is automatically controlled by a control process/system such as commonly used in geo-thermal binary systems and petrochemical plants.

Figure 22:
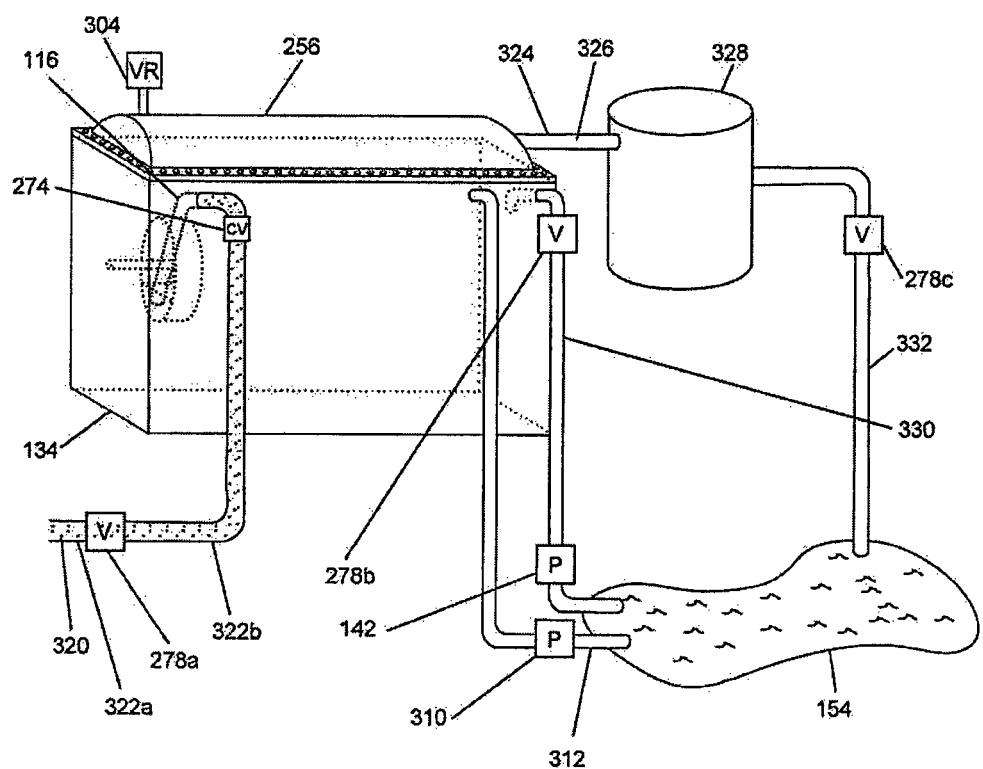
FIG. 22 is a perspective view of a HPC operated using a Steam Drive System.

FIG. 22 shows an HPC operated using a Steam Drive System. An amount of steam 320, commonly available from many different thermal sources such as fossil fuel burning, nuclear fission vessels, geo-thermal processes, etc., enters the HPC process through a steam input line 322*a* which couples to a control valve 278*a*. The outlet of the control valve 278*a* is coupled to a regulated steam input line 322. The distal end of the regulated steam input line 322*b* is coupled to a one-way check valve 274, the outlet of which is coupled to the HPC drive gas supply line 116 inside the tank 134. The steam is self condensed during HPC operations through a combination of drive liquid 111 cooling and expansion in the tank 134 as the steam runs through the HPC process from higher pressures at deeper tank depths to shallower tank depths.

Tank heat build-up is controlled through a temperature management system comprising of a hot drive liquid evacuation line 330 which begins under the drive liquid 111 upper surface inside the tank 134. The line 330 is coupled to a control valve 278*b*, whose outlet is coupled to a continuation of line 330 which is then coupled to a liquid flow pump 142, whose outlet is coupled to the continuation of line 330 which finally terminates at the cooling pool 154. Colder coolant is drawn from the cooling pool 154 by drive liquid return line 312 where the other end is coupled to a drive liquid return pump 310. The pump's 310 outlet is coupled to the continuation of the drive liquid return line 312, where the opposite end of the line 312 is coupled to the upper edge of the tank 134, where cool drive liquid is introduced into the inside of the tank 134.

A post-HPC steam remnant 326 leaves the surface of the inside of the tank 134 by a steam outlet line 324 coupled to the reinforced tank cover 256 where the other end of the is coupled to a remnant steam condensing system 328. Such a steam condensing system 328 is commonly used in larger steam heating systems used in commercial buildings. Steam condensate leaves the steam condensing system 328 through a steam condensate drain line 332 where the other end of the drain line is coupled to a control valve 278*c*, where the outlet end of the valve is coupled to the continuing steam condensate line 332. The other end of the steam condensate line terminates at the cooling pool 154. The HPC Steam Drive System is automatically controlled by control process/systems such as commonly used in steam heat plants and coal-based steam operated power plants.

Figure 23:
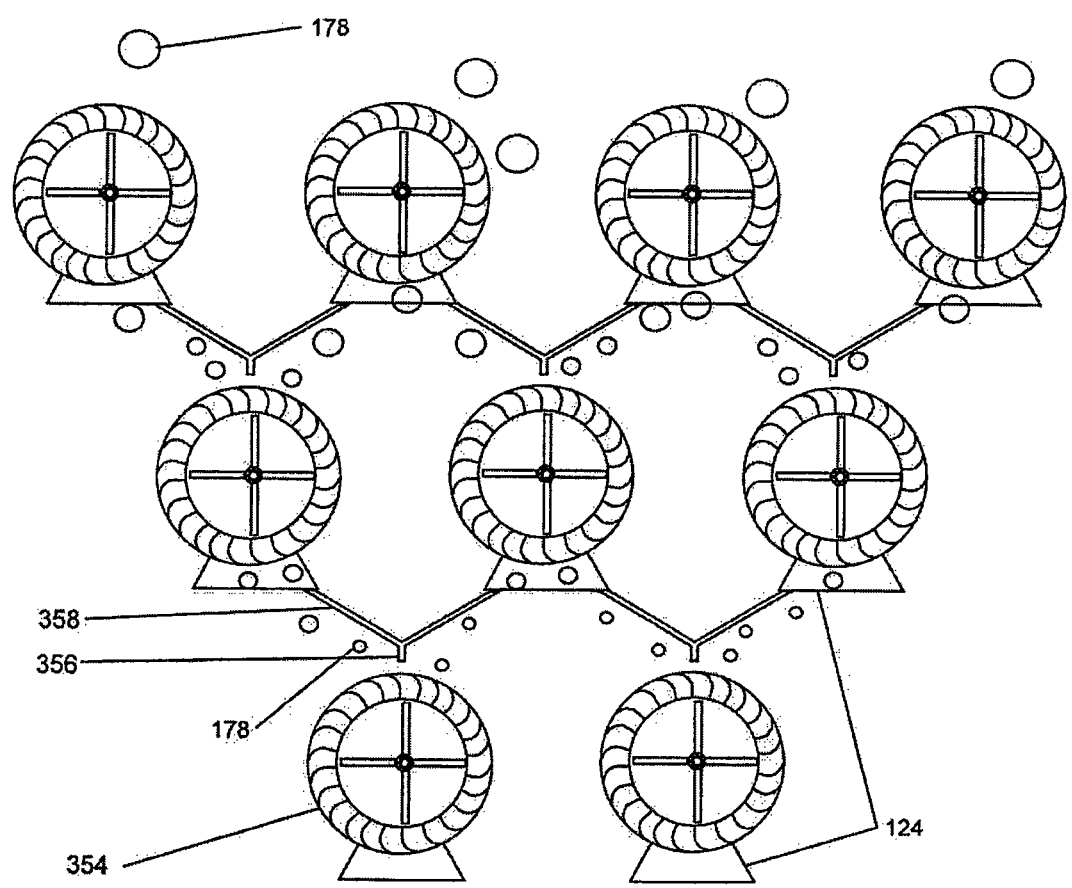
FIG. 23 is an end view of a Large Tank Cascade HPC configuration.

FIG. 23 shows a Large Cascade HPC configuration. A set of cascade HPCs 354 are set at distance from each other to allow distribution of drive gases 178 from the lower HPC 354 to upper tiered HPCs. Directly above the lowest single or multiple HPC row is a drive gas charge splitter plate 356 which is coupled to the lowest point of an upward pointing inverse chevron-like intermediate gas-charge diversion plenum 358. Coupled between the conjunctions of each pair of side-by-side diversion plenums is a drive gas plenum 124 which feeds the drive gas to the cascaded HC immediately above the plenum. The gas charge 178 is shown at various levels amongst the HPCs. Of note is the relative volume of each gas charge 178 representing the same mass/number of gas molecules of gas at differing levels of pressures at each depth. The drive gas expands as the pressure is reduced, allowing the same gas charge 178 to provide more buoyant volume displacement in the HPCs as the working pressure is naturally reduced as a function of depth. In essence, more HPCs of the same size and displacement can be placed on each of the successively shallower upper rows as shown in this figure. Alternatively, an embodiment not depicted is the use of a large single upside-down pan-shaped drive gas collector firmly coupled between each level of HPCs. Drive gases leaving a lower level can be collected in the gas collector where a gas-filled head space can build as additional gases are collected and held. The gas collector's inside upper surface at the top of the 'head space' can be level to the horizontal plane so that drive gases can collect to an even depth across the gas collector. Connected to the upper surface of this 'pan-shaped' gas collector can be plenums 124 where each plenum 124 receives an equal gas charge because of the drive gas head-space in the inverted pan gas collector. The drive gases can leave the pan, travel through gas control valves where each plenum receives the same amount of gases for their respective HPC's operations.

Figure 24:
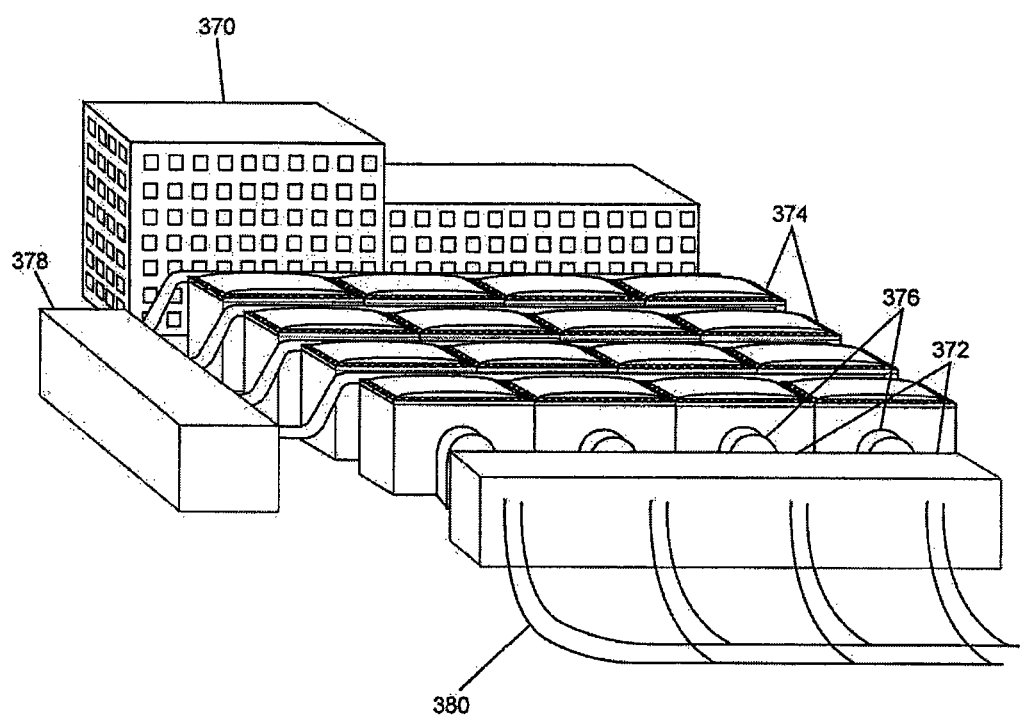
FIG. 24 is a perspective view of a HPC Base-load Power Plant.

FIG. 24 shows a depiction of an HPC Base-load Power Plant. A bank 374 can include one or more HPCs 102 where the specific HPC size and number of HPCs per bank is designed to fit the specific operational need of each installation. Shown are multiple banks of HPCs 374 where the delivered power requirement is quite large such as in a base load electrical power plant. Also shown is relative placement of a generator 376 placed on each HPC. Not shown is the placement of generators on both ends of the HPC allowing a single HPC to run two smaller less expensive generators versus one single large generator where design considerations dictate such an operation. A control house 370 is shown where the operational control of the HPC plant is managed and logistics and maintenance operations are planned and conducted for the plant. Also shown is a compression building 378 where the management of the drive gases is conducted whether the HPCs are driven by natural gas, binary system gases, steam, or other gases such as standard air. A power house 372 is shown to relatively depict placement of the electrical combining of multiple generator inputs and output of electrical power on a set of high tension lines out 380. Not shown or specifically depicted are automated control systems that can manage the plant wide operations. These automated control systems can be any conventional control system such as, for example, those used in hydro-electric dam electrical generation plants and coal-based steam operated power plants.

FIG. 25 shows an HPC designed with Deep Vanes and Buckets. A set of deep vanes 110 are provided that define the HPC's bucket spaces 109. Such deep vanes provide longer duration of buoyancy control of each gas charge held by each individual bucket vane set. The "deep vane" HPC embodiment is similar to the embodiment of FIG. 1 in all other aspects. Each specific HPC design is developed with a specification for required power outputs, where the designers can change the "wet area" as defined by the HPC 102 outer diameter, center core support 108 diameter. Additionally, the vane design in both specific curvature and length works to achieve the specific power output goal. Although not shown, there can be a requirement that any design must have a low relative hydro-dynamic drag coefficient in order to meet rotational mechanical power output needs.

Operational Description of how Hydro-pneumatic Power Cylinder Achieves its Results The HPC performs work by moving continuously through four phases of operation: gas charging/bucket filling; buoyancy conversion to rotational mechanical energy; gas charge depletion/bucket emptying; and back-side transition.

First Exemplary Embodiment: Gas-driven HPC—Plenum

In a first exemplary embodiment, an HPC is operated on compressed gases and supplied gases through use of a plenum chamber. In this embodiment, the HPC is designed to drive a base load/prime power electrical generation application. Other designs such as naval power, mechanical process drivers, etc., would operate similarly. Additionally, other drive gas sources can be used with necessary design considerations taken into account.

The entire gas-powered, plenum fed HPC system is ready to operate when the HPC 102 is properly situated in a HPC tank 134 filled with a drive liquid 111. The operator, through the HPC control system, applies temporary start-up power to one or more compressor drive motor(s) 140 for powering the compressor(s) 138. Referring to FIG. 7, the compressors draw drive gas 178 from inside the HPC tank cover 118, through the drive gas return lines 132a, 132b, the gas spin filter 136, and the intake one-way check valve(s) 141a. The tank cover pressure relief door 119 allows gas to enter the tank cover 118 and provides over-pressure and under-pressure protection to the tank cover 118 by allowing any gas over-pressure to vent to the atmosphere and allowing the introduction of atmospheric gases to the tank cover 118 interior in the case of gaseous under-pressure. During standard operations, the pressure relief door 119 remains closed to retain the clean operating gases inside the system, thereby removing the need for gas filtering subsystems. One or more compressor(s) 138 can compress the drive gas 178 and release the drive gas 178 under pressure. The pressurized drive gas 178 exits the compressor 138 as transported through the thermally insulated drive gas supply lines 116a, 116b, the output one-way check valve 141b, and inside the tank 134 to the drive gas supply control valve 176 (see FIG. 5). The drive gas 178 is under higher pressure than the static pressure of the drive liquid 111 'near' the bottom of the tank 134 and therefore displaces the drive liquid 111. The plenum's drive gas supply control valve 176 releases a 'set' amount/flow rate of this pressurized drive gas 178 into the drive gas distribution equalizer chamber 177 which allows the drive gas 178 to expand and equalize pressures to correspond with the depth-based pressure of the drive liquid 111 inside the drive gas plenum 124. The equalized drive gas 178 flows through the drive gas supply ports 168 and into the drive gas plenum 124.

The drive gas 178 enters the HPC bucket areas 109 which are located immediately above the drive gas plenum 124. At the beginning of this start-up sequence, the HPC 102 is static and not moving. During the HPC start-up operations, the control system overrides a plenum liquid-level sensor 170 control of the drive gas supply control valve 176 and drives the gas supply control valve 176 to the fully open position thereby allowing all available compressed drive gases 178 to pass through the drive gas distribution equalization chamber 177, the drive gas supply ports 168 and into the drive gas plenum 124. The drive gas 178 pushes the drive liquid 111 level inside the plenum 124 down until the drive gas 178, completely filling the plenum 124. Once the plenum 124 is filled, excess drive gas 178 escapes through the plenum drive gas overflow cutout 125 on the bottom of the 'drive' side of the plenum 124. This overflow cutout 125 is positioned higher than the other bottom edges of the plenum 124, causing the drive gas 178 to 'leak' here first. This 'leaking' drive gas 178 is buoyant and rises through the drive liquid 111 inside the tank 134 and into the HPC bucket areas 109 situated immediately above the 'drive' side of the plenum 124.

As HPC Vanes 110 constrain the drive gas 178 inside the individual HPC bucket areas 109, these bucket areas 109 fill with drive gas 178. This drive gas buoyantly replaces the drive liquid 111 out of the airtight HPC bucket area 109, thereby making that specific bucket area 109 of the HPC 102 full of drive gas and buoyant. Of specific note, and advantageous for many reasons on multiple embodiments, are vane intermediate supports 112 with their associated vane intermediate support gas pass-through openings 113. The vane supports 112 provide additional structure to strengthen the HPC 102 by providing additional load paths to transfer the substantial loads placed on each coupled vane 110 under buoyant load to the adjacent vanes 110, other vane supports 112, the core support 108, any core support internal bracing (not shown), and finally to the drive axle 104. The openings 113 in each support 112 separated bucket area 109, can perform the following functions: balance gas charges across each vane defined bucket area 109; allow multiple gas filling/charging designs; and lighten the overall weight of the vane intermediate supports 112 and HPC 102 as a whole. In the continued start-up sequence, as one bucket area 109 becomes full with drive gas 178, excess drive gas 178 'spills-over' that particular HPC vane's 110 lip/edge. These excess drive gases buoyantly float upwards and into the next available bucket area 109 and start to fill that next bucket area on the HPC with drive gas 178. Once enough bucket areas 109 fill with drive gas 178 and the gravity-based buoyant forces overcome the static inertia of the HPC 102, and the HPC 102 begins to rotate with these drive gas filled bucket areas 109 moving towards the top of the tank 134.

The rotating HPC 102 begins to present liquid-filled bucket areas 109 to the interior of the drive gas plenum 124. The heavy drive liquid 111 within the confines of the newly presented bucket area 109, by gravity's affect, buoyantly displaces the lighter drive gas 178 immediately below this bucket area as present inside the plenum 124. Since the density of most liquids is 600 or more times the density of most gases, the buoyant exchange is rather fast and energetic in and of itself. As such, each newly presented open HPC bucket area 109 gravitationally empties its heavy drive liquid 111 and fills with light drive gas 178. Another benefit of the drive gas plenum 124 design is the energetic liquid for gas exchange. The drive liquid 111 in the operational HPC bucket areas 109 are rotating around the HPC drive axle and are under centrifugal force. When exposed to the interior of the plenum 124, the drive liquids 111 are energetically ejected out of the buckets. This centrifugal ejection of drive liquid 111 past the HPC vane 110 imparts further rotational energy that can exceed the gravitationally draining of drive liquid 178 out of the bucket areas 109. This additional liquid-flow centrifugal-based rotational mechanical energy is additional to the rotational energy imparted by HPC's buoyancy forces alone.

The rotating HPC 102 builds power and speed as more buckets fill with drive gas 178 and passes over and away from the drive gas plenum 124. The HPC's drive-side percentage of gas-filled bucket areas 109 increases and therefore more buoyant energy is continually present on the HPC vanes 110, imparting more energy and speed to the HPC 102. The rotating HPC 102 removes drive gas 178 from the plenum 124 which is continuously replenished with newly delivered pressurized drive gas 178 as previously discussed. Once the HPC 102 is rotating, the HPC Control System begins using the output of the plenum liquid level sensors 171 in the liquid level sensor assembly 170 to set the volume of gas to be released into the drive gas distribution equalizer chamber 177 which in turn sets the plenum 124 drive liquid level. The liquid level sensors 171 can determine the drive liquid level inside the plenum 124 and its location on the side of the plenum 124. The placement of the sensors 171 determines the liquid level of the plenum 124 and serves to set the desired setting of the drive gas supply control valve 176 which operationally controls the flow rate/amount of drive gas 178 allowed to enter the plenum 124. This liquid level sensing and flow rate setting activity continues to the point where the flow rate/amount of drive gas 178 supplied to the plenum 124 meets an equilibrium with the amount of drive gas 178 being removed from the plenum 124. Such drive gases 124 depart the plenum 124 area inside each of the HPC bucket areas 109, thereby setting the drive liquid 111 level inside the plenum 124. A conventional gas control subsystem in the HPC control system can manage the plenum's 124 drive liquid levels such as pneumatic distribution and control systems in industrial blow-molding facilities.

The drive gas plenum 124 is situated inside/between the interior edges of the HPC's end plates 114 and the plenum-to-HPC vane seals 172 work to retain drive gases 178 inside the plenum 124, and exposed HPC bucket areas 109. Such design prevents drive gas 178 from leaking around the HPC vanes 110 adjacent to the exposed vanes 110 as these vanes transition into and out of the plenum's drive gas supply area as defined by the opening on the top of the plenum 124. The seals 172 are supported by a seal backer plate 174 on each end of the plenum 124, and the backer plates can be reinforced by seal backer plate supports 175. There can be other means of sealing the plenum to HPC interfaces.

As the HPC 102 rotates, the drive gas 178 remains inside the HPC bucket areas 109 providing buoyant forces for powering the rotation of the HPC 102. As the drive gas filled HPC buckets 109 rise along the drive side of the HPC 102, the drive gas 178 filled area of each bucket area 109 proportionally diminishes based on the aspect of the HPC's vanes 110 in relation to the horizontal level. The drive gas 178 inside the HPC bucket areas 109 'spills' out of the bucket as the aspect of the HPC vane's distal (outer) edge approaches the horizontal position as caused by the rotation of the entire HPC 102. In essence, the vane 110 is rotating relative to the horizontal and the drive gas is replaced by drive liquid 178 as the vane's 110 outer edge rotates. The HPC bucket areas 109 continue to 'spill' their submerged expended drive gas 178 contents as the buckets approach the top-most position caused by the HPC's rotation. By the time the distal edge of the HPC bucket 109 reaches the "zero degree" position in the HPC's rotation, almost all of the drive gas 178 will have spilled out of the bucket, being replaced by significantly heavier drive liquid 111, based on gravity's buoyant effects. For example, gases such as air weigh 0.08 lbs per cubic foot and heavy liquids such as water weigh 62.4 lbs per cubic foot. There are many combinations of drive gases and drive liquids available which can be used in the HPC. Optimally, the drive liquid will be as dense (mass per volume) as possible with a low drag-imparting viscosity, and the gas would be as light as possible since the density difference between the two substances defines the amount of buoyant forces per volume unit of measure available to do work.

As the HPC 102 continues to rotate, the drive liquid-filled HPC bucket areas 109 progress past the top-most position and then rotate down the non-drive side of the HPC 102. These drive liquid-filled HPC bucket areas 109 continue to be transported by HPC rotation and then enter into the drive gas plenum 124 to begin the drive gas 178 filling process all over again. Once the entire HPC operational process is started, the filling and emptying process is continuous and will not stop unless the drive gas 178 supply is stopped or the mechanical process-based resistance on the drive axle 104 opposes and exceeds the HPC's rotational energies. Where desired, such as prime power generation operations, multiple compressor designs allow virtually endless operations, where logistically any specific compressor can be taken offline for maintenance or replacement, while other compressors continue to deliver the necessary pressurized drive gas supply. The inline gas check valves 141*a* and 141*b* as shown in FIG. 7 allow for compressor maintenance or replacement by preventing drive gas pressure losses from under-maintenance compression equipment.

Once the HPC 102 reaches its optimal operating speed, the entire process reuses the same drive gas 178 thereby eliminating the need for any gas filtering equipment, keeping the drive liquid 111, compressors 138, in-line one-way check valves 141, thermally insulated drive gas supply lines 116, and drive gas return lines 132 free from external debris and contaminants.

Other features of the HPC design include low friction HPC support bearings 130 and low maintenance liquid-tight tank seals/stuffing boxes 122. Liquid temperature is maintained through control of the temperatures of the pressurized drive gas 178 and the circulation of heated compressor coolants through the tank 134 and a liquid cooling pool 154 (when necessary) as depicted in FIG. 8. Gaseous heat of compression concentrates thermal mass where the thermal energy in the drive gas 178 is concentrated into a smaller area during compression, as shown by gas compressor outlet pressure lines that are hot to-the-touch during compression operations. The converse is true when the drive gas 178 is allowed to uncompress where the heat retained in the gases is expanded by volume and thereby such expansion lines feel cool to the touch as the pressurized gas is released. The expanding drive gases 178 inside a drive gas plenum 124 are relatively cool and can chill the drive liquid 111 by continuously absorbing heat during the drive gas expansion in the drive gas distribution equalization chamber 177 and the plenum 124 and the HPC's rotationally-based transition from higher depth-based pressures in the bottom of the tank to the lower depth-based pressures at the top of the tank. The thermal energy provided during the gases' expansion come from the localized environment, i.e., from the surrounding drive liquid 111. If not designed properly, the drive liquid 111 can be continually chilled by gaseous expansion activity to the point of solidification/freezing. Such gas-expansion chilling/cooling action is the basis of larger passenger aircraft air conditioning systems designs. Unchecked, this cooling effect can slow or stop HPC energy extraction if the thermal energy content of the entire HPC operation is not managed.

Thermal management, as depicted by FIG. 8, begins by compressing the drive gas 178 and retaining the heat of compression so that that same/equal amount of heat is available to the drive gas 178 during expansion so that the tank's drive liquid 111 is not "chilled" to freezing levels by continuous HPC operations. The pressurized drive gas 178 can enter the thermally insulated drive gas supply lines 116 maintaining as much heat of compression as possible for the subsequent drive gas expansion. Some heat from the compression processes can also be available to make up the heat lost from the drive gas 178 during transmission through the thermally insulated drive gas supply lines 116. The continuously operating compressor(s) 138 generally require liquid cooling to maintain efficiency and reduce operational wear-out from increased temperatures caused by frictional activity inside the compressors. Some gas compression designs can also capture heat from the electrically-driven compressor drive motor(s) 140 which drive the compressor(s) 138. Keeping the motor(s) cool with designed liquid coolant jackets (not shown) can also extend their useful life and reduce electrical loads required to run the compressors.

The liquid coolant circuit, as depicted in FIG. 8, starts from the tank 134 where warmer tank drive liquid 111 is drawn out of the top of the tank by passing through the HPC liquid outlet line 146a, a first two-way liquid flow valve 144a, liquid outlet line 146b, liquid flow pump 142a, a second two-way liquid flow valve 144b, and into the liquid cooling pool 154. The 'cooled' liquid is pulled from the liquid cooling pool 154 through a third two way liquid flow valve 144c, the compressor liquid inlet line 150a, the compressor's liquid flow pump 142b, the compressor liquid inlet line 150b, and through the compressor's 138 liquid coolant system (not shown). The heated drive liquid 111 exits the compressor's 138 coolant system after being radiantly heated by the compressor's operations and passes through the HPC liquid inlet line 148a, another two-way liquid flow valve 144d, the HPC liquid inlet line 148b, and back into the tank 134. Between the two-way liquid flow valves 144a and 144e, located outside the tank 134, is a bypass circuit with a liquid bypass line 152 which, when activated, directs drive liquid from the compressor 138 to bypass the tank 134 and return to the liquid cooling pool 154.

If the drive liquid 111 temperature inside the tank 134 is at or above the design temperature, the tank bypass system is activated. This activates the set of two-way liquid flow valves 144a and 144e to direct drive liquid 178 through the liquid bypass line 152 and the liquid flow pump 142b, such that the drive liquid 178 flows from the compressor(s) 138 through the liquid bypass line 152 and into the liquid cooling pool 154. If the drive liquid 111 in the tank 134 is cooler than the design temperature, then the liquid cooling pool bypass circuit is activated to flow heated drive liquid 178 to enter the tank 134. The flowing of heated drive liquid 178 into the tank 134 occurs when the set of two-way liquid flow valves 144b/144c and liquid flow pumps 142a and 142b are energized and the cooling liquid bypasses the liquid cooling pool 154 and goes directly to the compressor 138 to pick up heat from the compression processes. An automated HPC temperature control subsystem can be any conventional control subsystem having a thermal control circuit such as is used in petro-chemical distillation plants and industrial food packaging plants. As part of the HPC control system, the temperature control subsystem can perform the temperature control actions autonomously. In one embodiment, if water is used as a drive liquid 111, the temperature of the tank 134 can be maintained between approximately 38-40 degrees Fahrenheit, i.e., close to the maximum density of water, thereby maximizing the buoyant forces available for the entire process. Any liquid or combination of different liquids can be used as a drive liquid such as bromine, mercury, or compounded liquids such as water, chloride, citric acid, carbon disulfide, ethylene bromide, ethylene glycol, etc. Use of other specific liquids as drive liquids can have different optimum temperatures for operation. Also, any gas or combination of different gases can be used as a drive gas such as hydrogen, helium, nitrogen, air, natural gases, carbon dioxide, etc.

For electrical power generation, such as depicted in FIG. 9, the HPC 102 rotationally powers the outer drive axle 107 which protrudes from the side of tank 134 to provide rotational energy/power for any desired purpose. For an electrical energy prime power application, the axle 107 can couple to an HPC drive axle power release 156 that acts as an overdrive/over-pressure clutch for protecting both the HPC 102 and the specific applications running gear from damage should a malfunction stop the process on either side of the clutch 156. The power shaft 157 delivers rotational power to a step-up gearbox 158 which exchanges a portion of the torque generated by the HPC for an increase in rotational speed. The desired gear ratio of the step-up gear-box 158 is dependent on the specific power input needs. The gearbox 158 output can be matched to the specific alternator/generator 160 needs. The intermediate power shaft 159 delivers rotational power from the step-up gear-box 158 to the alternator or generator 160 for creating electrical power. The electrical power is drawn off the alternator or generator 160 by an alternator/generator power output line 180 which couple to the electrical output control system 164. The electrical output control system 164 can split electrical output power between necessary components, such as running the compressor drive motor(s) 140, HPC pumps and subsystems, or providing the remaining electrical power to an external power output distribution system on the electrical output lines 162. In a self-powering design, once the system is producing sufficient electrical power, the electrical output control system 164 shuts off all external power to the compressor drive motor(s) 140 and feeds the compressor(s) power from the alternator/generator 160. If a generator 160 is used, the direct current produced by the generator 160 can be converted to alternating current by the electrical output control system 164. Such inverted power can be distributed to the compressor drive motors 140 with remaining electrical power being transmitted for external usage.

FIG. 24 depicts one exemplary embodiment of the HPC providing base-load prime power, where the banks 374 include multiple HPCs 102. Depicted are the generators 376 coupled to the individual HPCs 102 providing electrical power to the HPC plant's power house 372, and the HPC plant high-tension electrical feeder lines 380. The HPC plant compression house 378 adjacent to the banks of HPCs 374 can provide the drive gases 178 for HPC operations. Also shown is the HPC plant control house 370 from which the entire HPC plant complex is managed, logistically supported, and maintained.

An alternative design to this embodiment is shown in FIG. 23. Specifically designed "cascade" HPCs 354 allow reuse of drive gases through multiple HPCs 354 in one pass. The drive gas 178 is introduced into the lower HPC's plenum(s) 124. As the drive gas 178 operates the lowest level of HPCs 354, it emerges from the top of that level and is recollected by use of a drive gas charge splitter plate 356. The splitter plate 356 is positioned to collect the appropriate amount of drive gases on each side so as to present an equal gas charge to the intermediate gas charge diversion plenum 358 which accumulates spent drives gases 178 to pass into the drive gas plenum 124 and HPCs 354 in the next row (e.g., second row) above the bottom row of HPCs 354. If two HPCs 354 on the bottom row feed spent/expended drive gases 178 into three HPCs on the second row, then two-thirds of each of the bottom row's HPC drive gas 178 can be allocated to each of the successive row's plenums 124. The ascension of the drive gas 178 in the tank 134 (not depicted in FIG. 23) brings reduced depth-based pressure on the drive gas 178 and therefore allows such drive gas 178 to expand as it rises in the tank. Expanded drive gases 178 allow the same drive gas charge to operate additional HPCs 354 on each successive row. The drive gas charge splitter plate 356 can be positioned to apportion the drive gases accordingly. In the second row of three HPCs 354, which are feeding four successive HPCs 354 in the top row, the outside second row HPCs can apportion their splitter plates to provide three-quarters of their drive gases to the outside HPC's 354 on the upper row and only one-quarter of their gases to the inner HPCs on that same upper row. The middle HPC 354 in the second row can have its splitter plate set to apportion half of its expended gases to the two inner HPCs on the top row. In this example, all of the HPCs 354 on the top row can receive three-quarters of the gas charge of each of the HPCs 354 in the middle or second row. The reduction in pressure on the drive gases 178 as caused by a reduction in depth allows the expansion the drive gases 178 and each of the top row of HPCs 354 will receive as much drive liquid 111 displacing drive gas 178, by volume, as the preceding HPC rows. Alternatively, an embodiment not depicted is the use of a large single upside-down pan-shaped drive gas collector firmly affixed between each level of HPCs. Drive gases 178 leaving a lower level can be collected in the flat-roofed gas collector where a gas-filled head space would build as additional gases are accumulated and held. The gas collector's inside upper surface at the top of the 'head space' would be level to the horizontal plane so that drive gases would collect to an even depth across the gas collector. Connected to the upper surface of this 'pan-shaped' gas collector can be plenums 124 where each plenum 124 receives an equal gas charge because of the drive gas head-space in the inverted pan gas collector. The drive gases can leave the pan through openings coupled to plenum gas control valves where each plenum on a given row receives the same amount of gases for their respective HPC's operations.

Second Exemplary Embodiment: HPC-based Naval Power Application

In a second embodiment, i.e., a naval power application, the entire HPC and its sub-systems can be accommodated inside a boat/ship hull as shown in FIG. 10. Many of the HPC operations described above are the same for this embodiment and thus will not be repeated. Several design accommodations can be made to put a ship-borne HPC into operation. The Naval HPC's thermal management of the drive liquid 111, is accomplished by pumping water 182 external to the ship through the water intake port 186 via a water intake pump 188. The same water is also pumped through the compressor liquid inlet line 150 and the compressor's liquid coolant system. The drive liquid 111 exits the compressor 138 through the HPC liquid inlet line 148 and flows to the HPC liquid bypass system. This bypass system consists of a two-way liquid flow valve 144 which either directs the drive liquid 111 into the sealed HPC tank system 190 to raise the temperature of the drive liquid 111 inside the tank 190 or directs the drive liquid 111 into a tank bypass purge line. This purge line would bypass the tank 190 and couple its flow directly to the sea water outlet port 197. The aft end of the tank 190 in relation to the ship has a water system outlet valve 196 aft of the bottom of the tank 190 which opens to allow tank-based liquid to be dumped off board through the water outlet port 197. The Naval HPC System's power generation system with a direct-drive arrangement where the outer drive axle 107 is coupled with an alternator/generator 160 and otherwise operates similar to the prime-power generation design discussed earlier. In a naval ship-borne application, some electrical power can be applied to the ship-drive motor(s) 192 which rotates propeller shaft(s) 195 and the ship's propeller(s) 194. Additionally, some of the electrical energy can be used to energize the compressor drive motor(s) 140, and the remaining electrical energy can be dispersed to the ship's other systems as needed. Naval HPC Systems, depending on specified design requirements can accommodate single or multiple HPC systems which can use single or multiple compressor designs as well as single or multiple ship-drive motor/propulsion designs.

Third Exemplary Embodiment: Direct Injection Gas-driven HPC

As depicted in FIG. 18, an HPC 102 can be gas-charged by means of a rotary valve arrangement where the HPC 102 rotates and the valve body is static. In this embodiment, the HPC 102 can have a rotary valve body 226 centered on the HPC drive axle 104, fitted in a recess in each of its end plates 114. The rotary valve body 226 provides direct injection of gases into the bucket areas as they rotate through the bottom position of the HPC 102. During operation, the direct injection gas-driven HPC 102 has drive gases 178 transported through the thermally insulated drive gas supply line 116 to the stationary rotary valve body 226. The drive gas 178 continues through the rotary valve gas passageway 228 and enters the rotary valve gas emission orifice 230. As an HPC bucket area 109 transitions through the lowest point of its rotation and passes this orifice 230, the drive gases 178 enter the core support cylinder-end of the bucket area 109. In this embodiment, the core support cylinder has core cylinder support gas orifices (not shown) cut out of the 'floor' of each bucket where each orifice corresponds to each end of the bucket area 109. Each bucket area 109 has two orifices, one formed in each distal end of the bucket area's 'floor'. When these orifices begin to overlap the rotary valve gas emission orifice 230, gas is transferred to that specific bucket area 109. The gas charge for each bucket area 109 is determined by the drive gas 178 pressure, size of the rotary valve gas emission orifice 230, size of the HPC core support 108 orifice, and the speed of rotation of the HPC. The design and end-use of the HPC are to be matched where the specifically engineered design measurements of the orifices will be set. An external baffle 236 can be statically supported by baffle-to-tank supports 238 where this singular or set of multiple baffles 236, can be added to provide liquid back pressure to the drive liquids 178 being pushed out of the bucket areas 109 by the direct gas injection, giving a boost to the pump-jet action of the direct injection design.

Alternately, the HPC core support 108 can be designed to not meet the end caps 114, where the inner proximal end of the rotary valve body 226 abuts the distal ends of the core support 108. In this alternative to Embodiment, the rotary valve body's 226 proximal end can be capped off to provide a solid internal support to the large rotary valve body 226. This alternative would make provision for the drive axle 104 to be strongly coupled to the HPC core support 108 by an internal structure (not shown). This drive axle 104 extends completely through the center of the rotary valve body 226 so as to couple with outer drive axles 107 and other machinery as specified by the end use of the system. A second alternative would be to affix the HPC core support to the inside edge of the end-plate 114 where the rotary valve body 226 slides into the inside of the core support 108 in a close tolerance manner. The drive axle 104 would again be strongly coupled to the core support by an internal structure and extend from the core support attachment through the rotary valve body 226. An amount of drive gases 178 can be directed to this narrow area between the outer face of the rotary valve body and the inner surface of the exposed HPC core support so as to act as a cushion between the two surfaces. Such a design would allow the rotary valve body 226 to act as a large air bearing eliminating a need for the HPC axle bearings 120. In any of this embodiment's alternatives, the direct filling of the bucket areas 109 from the inside out can provide a jet-pump-like boost to the HPC's total power output. Since the direct injection filling action occurs in each bucket area 109 during operational use, this boost is continuous and is additive to the HPC's buoyancy-based power output.

Fourth Exemplary Embodiment: Natural Gas Driven HPC Operation

In another embodiment, a natural gas driven HPC is constructed similarly to the first embodiment and depicted in FIG. 20. The HPC 102 uses natural gas as a compressed drive-gas source. In industrialized countries, natural gas is transferred from supply sources to the end users through pipelines at high pressures up to 1200 psi. A natural gas driven HPC system can be situated near the end user, where the gas pressure is reduced from transportation pressures to regulated pressures for use such as industrial applications and residential interior heating and hot water heating.

This embodiment is operated by high-pressure natural gas being introduced to the HPC system through a natural gas high-pressure inlet line 250 which brings the natural gas to a natural gas inlet pressure regulator 252. After passing through the inlet pressure regulator 252, the natural gas flows to the tank 134 through the regulated natural gas inlet line 254 where the natural gas moves into the thermally insulated drive gas supply line 116. The tank 134 has a reinforced tank cover 256, which is securely coupled to the tank. In FIG. 20, the tank cover 256 is coupled by use of reinforced tank cover hold-down bolts 258. The reinforced tank cover 256 can be strongly coupled in place by other means such as massive and extensive weight, tank cover latching systems, an interference means, strong wraps/ties/cables, or any combination thereof.

Once the natural gas has departed the upper surface of the drive liquid 111 inside the tank 134, it flows out of the tank/tank cover through the natural gas HPC outlet line 260. The natural gas then travels to a single or multiple set of natural gas/drive liquid vapor separator 262 where the separated drive liquid 111 is separated from the natural gas and drawn off the separator where drive liquid return pump 310 sends the reclaimed drive liquid through the drive liquid condensate return line 292 and deposited back to the tank 134. The 'scrubbed' cleaned natural gas leaves the separator 262 through the separator natural gas outlet line 266 and enters the natural gas post-separator pressure regulator 268, where the natural gas pressure is dropped to a process ending pressure ready for end customer use through natural gas post-HPC outlet service line 270.

An alternative embodiment can have the gas leave the separator 262 through the separator natural gas outlet line 266 and enter a natural gas recompression station (not depicted). The post HPC system re-compressed natural gas could then be re-distributed along another gas distribution system. This can allow waste-less electrical energy generation anywhere along a high pressure gas distribution line. Either embodiment can include conventional automated supervisory control and data acquisition (SCADA) systems to control any remote natural gas driven HPC operations from significant distances. Like the previously described embodiments, automated control systems are used in the petro-chemical gas distribution industry.

Fifth Exemplary Embodiment: Thermal Binary Gas Driven HPC Operation

In a different embodiment, the HPC system can be driven by thermal sources by use of a "binary system". One skilled in the art will understand the function of many of the components shown in FIG. 21. A heat source from geo-thermal/coal fired/liquid fossil fuels/natural gases/nuclear processes enters the Thermal binary drive HPC system at two locations. First, the heat source provides heat through the thermal source input line 282 as controlled by a control valve 278 and enters into the binary system evaporator 286. The heat then evaporates a low boiling point binary drive liquid such as iso-butane or pentane into a binary drive gas. The expended heat source material can return to the heat source processes through the thermal source return line 284.

The aforementioned evaporated binary drive gas, under significant pressure from the evaporation process, flows through a control valve 278 along the binary drive gas input line 280, through a one-way check valve 274a and into the tank 134 for buoyantly driving the HPC. Use of safety preventatives such as check valves, multiple control valves, etc., act as redundancy measures should primary safety systems such as supply lines, pumps and other valves fail.

The second use of the heat source is to bring the drive liquid inside the tank 134 to a temperature well above the boiling point of the binary drive gas. The pressure on the binary drive gas from the evaporation process and the depth of the HPC inside the tank 134 both work to increase the boiling point of the binary drive gas. Without increasing the drive liquid's temperature above this under-pressure binary drive gas boiling point, the binary gas would condense inside the HPC and therefore not provide much buoyant force for mechanical rotational power conversion. The heat source supplies heat through a separate closed loop system as depicted by tank heater circuit 276 and the associated control valve 278. Tank heating can be automatically controlled by conventional control circuit, potentially as simple as the ubiquitous thermocouple control circuit on a hot water heater.

Once inside the tank 134, the HPC can operate as previously described in the embodiments above. The spent binary drive gas can exit the drive liquid inside the tank under the reinforced tank cover 256 and enter the binary drive gas HPC outlet line 302. The line 302 takes the binary drive gas to the binary drive gas/drive liquid distillation separator system 300. The separator system is often used in the petro-chemical and food processing industries. In FIG. 21, a process is shown for removing the drive liquid 111 from the binary drive gas. The drive liquid is drained off by a drive liquid return pump 310 and subsequently returned to the tank 134 through the drive liquid condensate return line 292.

The binary drive gas leaves the separator process through the binary drive gas condenser input line 298 as regulated by the control valve 278 and enters the binary system condenser 290. Once inside the condenser, the binary drive gas condenses into the binary liquid condensate 296. The condensation action applies suction to the binary gas lines feeding the condenser aiding evacuation of the separator system 300. Low pressures assist the condensation of higher boiling point liquids such as the drive liquid as in relation to the binary liquid. Any trace amounts of drive liquid remaining in the binary gas stream entering the condenser 290 will then condensate and drop to the bottom of the condenser 290 and are drawn off in the drive liquid condensate return line 292 by the drive liquid return pump 310 and then returned to the tank 134. The condenser coolant circuit starts at a coolant source such as a cooling pool 154 where a condenser coolant input line 314 draws coolant from the pool as controlled by the condenser coolant pump 316. The coolant is passed through the condenser's closed coolant circuit while it absorbs heat from the condensing gases and leaves the condenser 290 and returns through the condenser coolant return line 318 to the cooling pool 154. Alternatively, this embodiment can use other means to disperse the coolant's thermal energy such as cooling towers and/or evaporative coolers/chillers.

Binary liquid leaves the condenser 290 through a binary liquid line 306 as pumped by the binary liquid pump 288 and is then deposited into the binary liquid storage tank 297 for reuse in the closed loop binary system. The storage tank 297 then provides binary liquid to the binary liquid pump 288 which then pumps the appropriate controlled amount of binary liquid into the evaporator to continue the binary system cycle continuously.

This embodiment also features a tank over-pressure relief valve 304 which provides over-pressure relief for the tank 134 and reinforced tank cover 256. The tank over-pressure relief valve 304 outlet is coupled to the binary drive gas pressure relief line 303 which directs any vented binary gas for temporary storage to a binary gas pressure relief tank 299. The radiant cooling of the binary gas inside the pressure relief tank 299 and the elevated gas pressure inside an activated pressure relief storage tank 299 can cause the binary gas to condense where it can be drawn off the tank by another binary liquid line through a control valve 278 and either be stored in the binary liquid storage tank 297 or drawn by the binary liquid pump 288 into the evaporator 286 for reuse.

Alternately, this embodiment can eliminate the binary gas/drive liquid separator system 300 entirely with a condenser design allowing for continuous condensing and separating of the binary liquid condensate 296 and drive liquid condensate 294.

Sixth Exemplary Embodiment: Steam Driven HPC Operation

In another exemplary embodiment, steam is used at significant pressure to drive the HPC 102 inside the tank 134. In essence, a heat source such as but not limited to geo-thermal/coal fired/liquid fossil fuels/natural gases/nuclear processes heats and provides the steam to the HPC for operational use. In FIG. 22, the steam 320 enters through the steam input line 322 as managed by control valve 278. The steam then continues to the tank 134 through continuation of the steam input line 322. The steam enters the drive gas supply line 116 and powers the HPC. However, inside the HPC, during operations, several important processes occur. As hot steam fills the HPC buckets 109, some of the steam will condense into water and join the drive liquid inside the tank, imparting its thermal energy to the surrounding tank liquid and HPC structure. As the tank internal environment rises in temperature, a higher percentage of steam will remain in its energetic gaseous state for a longer period, imparting buoyant forces on the vanes of the HPC. The HPC 102 will begin to rotate as more steam enters the HPC's buckets and imparts more thermal energy to the tank environment. At a temperature, dependent on the drive liquid composition and associated effective boiling points, the HPC will achieve thermal stasis and the steam will effectively operate the HPC as any other drive gas. At the HPC steam stasis point, the steam will enter the buckets and operate the HPC where the initial pressure keeps the steam's latent heat above the boiling point of water. However, as the HPC rotates and the buckets 109 rise from the tank's 134 depths, the steam as a gas will receive less externally applied pressure and begin to expand in volume. As the steam expands in volume, the latent heat of the steam is similarly expanded and therefore overall heat per the volume area decreases in accordance with all known gas pressure-volume-temperature laws. Additionally, the HPC structure surrounding the steam is absorbing some of the remaining heat in the steam. At stasis, the HPC buckets begin at the bottom with a full gas charge, and by the time the steam bucket reaches the top position, the steam has lost its thermal energy through thermal conductance and expansion by way of decreasing tank depths and the steam has condensed into water.

To maintain stasis, the tank environment must be maintained at the stasis temperature. The constant introduction of new steam will over time increase the tank's internal temperature to above stasis and be less than ideal for effective steam operations, forcing the need for additional thermal management efforts. To maintain stasis, the tank temperature will be managed through use of a cooling source such as a cooling pool 154. Alternatively, other cooling systems can be used such as cooling towers, evaporative coolers, and chiller units. Hot drive liquid will be drawn off the top of the tank 134 through the hot drive liquid evacuation line 330 as managed by a control valve 278 and continued through a liquid flow pump 142. The pump's outlet would then be released into the cooling pool 154. Cooler liquid would be drawn from the cooling pool through the drive liquid return line 312, a drive liquid return pump 310 and be deposited back inside the tank 134.

Alternately, if a drive liquid is used which cannot or should not be released into an open cooling pool, a closed circuit cooling loop can draw the hot drive liquid from the tank and be pumped through a closed-circuit cooling loop to be returned to the tank 134 with less thermal energy. Such designs are commonly used in cooling towers and immersed piping cooling systems in thermal tank environmental controls for large buildings in cities around the world.

For those steam gases remaining above the surface of the hot drive liquid, a steam outlet line 324 can draw off the used post HPC steam remnant 326 and take it to a remnant steam condensing system 328 where the steam is condensed. Post-condensing system water can be taken by a steam condensate drain line 332 to the cooling pool for storage or back to the steam generation source for reuse.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

One of these such variations can include filling HPC buckets by use of a partial-length plenum where such a plenum is placed between extended-circumference intermediate vane supports which act as extra-plenum seals where the gas is transferred from the plenum to the bucket spaces directly above the plenum and the gas disperses along that bucket space through intermediate vane support gas pass-through holes. More than one partial-length plenum may be used on a single longer-bodied HPC. Another variation may include filling HPC buckets by use of gas directors located below the HPC, axle-based gaseous injection, and HPC side-vents/passageways gaseous injection. Other embodiments may build the HPC with varying bucket shapes and sizes.

Another embodiment may use various compressor types and displacements to supply HPC drive-gases. It can also be possible to have an HPC unit run inside various liquid tanks such as a flexible sea tank/bladder, a rigid-solid-sealed tank, etc. Alternatively, it can be possible to have an HPC unit run in a natural submarine environment such as a river, lake, sea or ocean without a solid walled tank. Such alternative can use an open-to-the-sea/lake/ocean structure to hold the bearings and other normally internal-to-tank items such as drive gas supply lines, plenums, etc. Such an arrangement would have the means to transfer the mechanical energy to the surface such as by use of 90-degree gearboxes and vertical power transmission shafts.

In some embodiments, the HPC can be operated pressure capable tanks in a serial sequence using the same gas charge going from one tank and into another in a serial manner. In addition, the HPC can operate in a reverse cascade stack using the same gas charge where the drive gas is pumped to a bottom HPC, used by the bottom HPC then collected internal to the tank and applied to another HPC directly above the bottom HPC. This embodiment could have multiple HPCs on the upper stages of the cascade where the bottom HPC is a single or double row of HPCs, the next stage or level could have a plurality of HPCs driven by the re-combined lower pressure expanded drive gases. The greater number on each higher stage is allowed by the expansion of the drive gases as they rise from the depth of the tank.

In addition, the HPC can be operated as either a solo unit or multiple units at a power station to provide electrical power. A single HPC can operate on its own to provide high torque for various processes.

In an alternative embodiment, it can be possible to use different gases and/or mixtures of gases as the drive gas for the HPC. Also, different liquids and/or liquid mixtures can be used as the drive liquid for the HPC.

The HPC can be built in various sizes from small power units to multi-megawatt units. The HPC can be used to drive alternator(s) and/or generator(s). The HPC can also use alternate temperature control techniques, such as cooling pools and refrigeration, for example, to control the liquid temperature for both the HPC and the compressor. This is essential if a hot or molten substance is used as the drive liquid.

The HPC can run generator(s) or high torque process(es) using direct-drive without use of a drive axle speed step-up apparatus. It can be possible to use an HPC unit to drive an industrial apparatus versus an electrical alternator/generator, to provide drive power naval vessels, to provide prime electrical power for naval vessels and or naval drilling platforms, to provide prime electrical power for ocean/naval drilling platforms, and/or to drive water pumps for hydro-electric dam pump back or irrigation.

In another embodiment, an alternate axle gas introduction design can be used for introducing micro-bubbler gases for micro-bubbler processes on HPC vanes and end-plates, thereby allowing the use of both ends of the HPC axle shaft to drive power generation or other industrial uses.

What is claimed is:

1. A hydro-pneumatic cylinder, comprising:
a first end plate and a second end plate oppositely disposed from one another in the cylinder, the first and second end plates being at least partially planar and parallel to one another;
a drive axle extending longitudinally through the cylinder and passing through the first and second end plates;
a core support coupled to each end plate and the drive axle, the core support being centrally disposed in the cylinder;
a plurality of vanes, each of the plurality of vanes coupled to the core support and the first and second end plates, wherein each of the plurality of vanes includes a proximal end secured to the core support and a distal end separated from the proximal end;
a microbubbler secured to the distal end of at least one of the plurality of vanes;
a bucket area defined by the core support, two of the plurality of vanes, and the first and second end plates; and
a vane support coupled to the plurality of vanes, the vane support being at least partially parallel to the first and second end plates, wherein the vane support defines a plurality of openings formed therein through which a fluid can pass for equalizing pressure in the bucket area.

2. The cylinder of claim 1, further comprising a microbubble system with a first microbubble emitter coupled to at least one of the plurality of vanes, and a second microbubble emitter embedded in an outer circular face of the first end plate.

3. The cylinder of claim 1, wherein the drive axle includes a linear fluid passageway defined therethrough spanning from the first end plate to the second end plate within the drive axle.

4. The cylinder of claim 1, wherein the vane support divides the bucket area into a first portion and a second portion, the first portion being fluidly coupled to the second portion by the plurality of openings defined in the vane support.

5. A hydro-pneumatic cylinder for converting buoyancy energy into kinetic energy, comprising:
a first end plate and a second end plate oppositely disposed from one another in the cylinder, the first and second end plates being at least partially planar and parallel to one another;
a drive axle extending longitudinally through the cylinder and passing through the first and second end plates;
a core support coupled to each end plate and the drive axle, the core support being centrally disposed in the cylinder;

a plurality of vanes, each of the plurality of vanes coupled to the core support and the first and second end plates;

a bucket area defined by the core support, two of the plurality of vanes, and the first and second end plates;

a first dynamic drag reduction apparatus coupled to at least one or more of the vanes, the first dynamic drag reduction apparatus being at least partially parallel to the vane to which it is coupled; and a second dynamic drag reduction apparatus coupled to one of the first and second end plates, the second dynamic drag reduction apparatus being at least partially parallel to the first and second end plates;

wherein the first end plate has a circular face;

further wherein, the second drag reduction apparatus is a microbubbler secured to the first end plate, the microbubbler having an emitter surface flush with the circular face of the first end plate.

6. The cylinder of claim 5, further comprising a vane support coupled to the plurality of vanes, the vane support being at least partially parallel to the first and second end plates, wherein the vane support defines a plurality of openings formed therein through which a fluid can pass for equalizing pressure in the bucket area.

7. The cylinder of claim 6, wherein the vane support divides the bucket area into a first portion and a second portion, the first portion being fluidly coupled to the second portion by the plurality of openings defined in the vane support.

8. The cylinder of claim 5 wherein the second drag reduction apparatus is a microbubbler with a bubble emitter surface, a first portion of the bubble emitter surface having a first density of emitter holes, a second portion of the bubble emitter surface having a second density of emitter holes, the second density being greater than the first density.

9. A hydro-pneumatic cylinder, comprising:

a first end plate and a second end plate oppositely disposed from one another in the cylinder, the first and second end plates being at least partially planar and parallel to one another;

a drive axle extending longitudinally through the cylinder and passing through the first and second end plates;

a core support coupled to each end plate and the drive axle, the core support being centrally disposed in the cylinder;

a plurality of vanes, each of the plurality of vanes coupled to the core support and the first and second end plates;

a microbubble system including a first microbubbler emitter and a second microbubbler emitter, the first microbubbler emitter coupled to at least one of the plurality of vanes and the second microbubbler emitter embedded in an outer circular face of the first end plate;

a bucket area defined by the core support, two of the plurality of vanes, and the first and second end plates; and a vane support coupled to the plurality of vanes, the vane support being at least partially parallel to the first and second end plates, wherein the vane support defines a plurality of openings formed therein through which a fluid can pass for equalizing pressure in the bucket area.

10. The cylinder of claim 9, wherein each of the plurality of vanes includes a proximal end secured to the core support, and a distal end separated from the proximal end.

11. The cylinder of claim 9, further comprising a microbubbler secured to the distal end of at least one of the plurality of vanes.

12. The cylinder of claim 9, wherein the drive axle includes a linear fluid passageway defined therethrough spanning from the first end plate to the second end plate within the drive axle.

13. The cylinder of claim 9, wherein the vane support divides the bucket area into a first portion and a second portion, the first portion being fluidly coupled to the second portion by the plurality of openings defined in the vane support.

* * * * *